US012694578B2

(12) United States Patent
Tanjim et al.

(10) Patent No.: US 12,694,578 B2
(45) Date of Patent: Jul. 28, 2026

(54) MULTI-MODAL RETRIEVAL USING AN INTERMEDIATE NOISE STATE

(71) Applicant: ADOBE INC., San Jose, CA (US)

(72) Inventors: Md Mehrab Tanjim, Santa Clara, CA (US); Chen-Yi Lu, West Lafayette, IN (US); Kanak Mahadik, San Jose, CA (US); Anup Bandigadi Rao, San Jose, CA (US)

(73) Assignee: ADOBE INC., San Jose, CA (US)

( * ) Notice: Subject to any disclaimer, the term of this patent is extended or adjusted under 35 U.S.C. 154(b) by 126 days.

(21) Appl. No.: 18/632,414

(22) Filed: Apr. 11, 2024

(65) Prior Publication Data

US 2025/0322553 A1     Oct. 16, 2025

(51) Int. Cl.
| | |
|---|---|
| *G06T 5/60* | (2024.01) |
| *G06F 16/53* | (2019.01) |
| *G06T 5/00* | (2024.01) |
| *G06T 5/70* | (2024.01) |
| *G06T 5/73* | (2024.01) |
| *G06T 11/00* | (2006.01) |

(52) U.S. Cl.
CPC .............. *G06T 11/00* (2013.01); *G06F 16/53* (2019.01); *G06T 5/73* (2024.01)

(58) Field of Classification Search
CPC ................ G06T 5/60; G06T 5/70; G06T 5/00
See application file for complete search history.

(56) References Cited

U.S. PATENT DOCUMENTS

| | | | |
|---|---|---|---|
| 11,983,488 B1* | 5/2024 | Puri ........................ | G06F 40/30 |
| 2023/0377226 A1* | 11/2023 | Saharia .................... | G06N 3/08 |
| 2024/0264718 A1* | 8/2024 | Benedetto ............. | G06N 3/047 |
| 2024/0345551 A1* | 10/2024 | Ramanasankaran ........................ | |
| | | | G06N 3/0895 |
| 2024/0362756 A1* | 10/2024 | Zhang ....................... | G06T 9/00 |

OTHER PUBLICATIONS

Beaumont, et al., "LAION-AI/aesthetic-predictor", available at https://github.com/LAION-AI/aesthetic-predictor, retrieved Mar. 12, 2024, 3 pages.
Blattmann, et al., "Retrieval-Augmented Diffusion Models", 36th Conference on Neural Information Processing Systems (NeurIPS 2022), pp. 1-16, 2022, 16 pages.
Chen, et al., "Re-Imagen: Retrieval-Augmented Text-to-Image Generator", arXiv preprint arXiv:2209.14491v3 [cs.CV] Nov. 22, 2022, 25 pages.
Guo, et al., "Accelerating Large-Scale Inference with Anisotropic Vector Quantization", arXiv preprint arXiv:1908.10396v5 [cs.LG] Dec. 4, 2020, 18 pages.

(Continued)

*Primary Examiner* — Yi Yang
(74) *Attorney, Agent, or Firm* — F. CHAU & ASSOCIATES, LLC

(57) ABSTRACT

A method, apparatus, non-transitory computer readable medium, and system for data processing include obtaining a text prompt and generating a first intermediate noise state based on the text prompt, retrieving a second intermediate noise state based on the text prompt and the first intermediate noise state, and generating a synthetic image based on the text prompt and the second intermediate noise state.

20 Claims, 14 Drawing Sheets

(56) References Cited

OTHER PUBLICATIONS

Heusel, et al., "GANs Trained by a Two Time-Scale Update Rule Converge to a Local Nash Equilibrium", arXiv preprint arXiv:1706. 08500v6 [cs.LG] Jan. 12, 2018, 38 pages.

Johnson, et al., "Billion-scale similarity search with GPUs", arXiv preprint arXiv:1702.08734v1 [cs.CV] Feb. 28, 2017, 12 pages.

Malkov et al., "Efficient and robust approximate nearest neighbor search using Hierarchical Navigable Small World Graphs", IEEE Transactions on Journal Name, Manuscript ID; arXiv preprint arXiv:1603.09320v4 [cs.DS] Aug. 14, 2018, 13 pages.

Radford, et al., "Learning Transferable Visual Models From Natural Language Supervision", arXiv preprint arXiv:2103.00020v1 [cs. CV] Feb. 26, 2021, 48 pages.

Sheynin, et al., "KNN-Diffusion: Image Generation via Large-Scale Retrieval", arXiv preprint arXiv:2204.02849v2 [cs.CV] Oct. 2, 2022, 26 pages.

Zhang, et al., "ReDi: Efficient Learning-Free Diffusion Inference via Trajectory Retrieval", arXiv preprint arXiv:2302.02285v2 [cs. CV] Oct. 25, 2023, 16 pages.

* cited by examiner

```
{
    "embeddings": np.ndarray(),
    "metadata": {
        "prompt": str,
        "noises": {
            "step_0": noise_url,
            "step_4": noise_url,
            "step_8": noise_url,
            "step_12": noise_url,
            "step_16": noise_url,
            "step_20": noise_url,
            "step_24": noise_url,
            "step_28": noise_url,
            "step_32": noise_url,
            "step_36": noise_url,
            "step_40": noise_url,
            "step_44": noise_url,
            "step_48": noise_url,
        },
        "image": image_url,
        "config": "config.json",
    }
}
```

FIG. 9

Obtain a text prompt ⌐1005

Generate a first intermediate noise state based on the text prompt ⌐1010

Retrieve a second intermediate noise state based on the text prompt and the first intermediate noise state ⌐1015

Generate a synthetic image based on the text prompt and the second intermediate noise state ⌐1020

1000

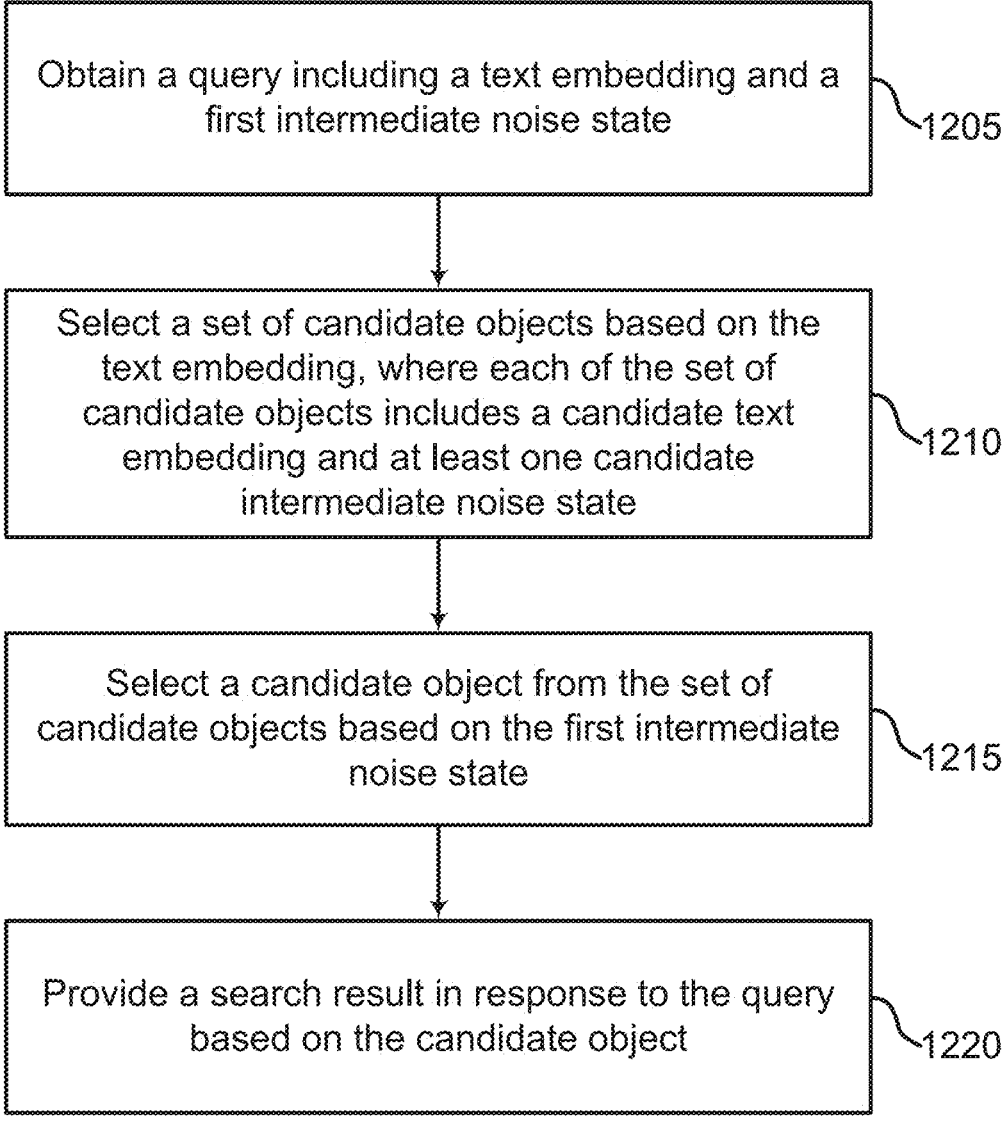

Obtain a query including a text embedding and a first intermediate noise state

~1205

Select a set of candidate objects based on the text embedding, where each of the set of candidate objects includes a candidate text embedding and at least one candidate intermediate noise state

~1210

Select a candidate object from the set of candidate objects based on the first intermediate noise state

~1215

Provide a search result in response to the query based on the candidate object

MULTI-MODAL RETRIEVAL USING AN INTERMEDIATE NOISE STATE

BACKGROUND

The following relates generally to data processing, and more specifically to multi-modal retrieval using an intermediate noise state. Information can be provided in multiple modalities, such as a text modality, an image modality, a video modality, and the like.

Machine learning algorithms build a model based on sample data, known as training data, to make a prediction or a decision in response to an input without being explicitly programmed to do so. One area of application for machine learning is information retrieval. For example, a machine learning model can be trained to retrieve information in one modality (such as an image) based on an input provided in a different modality (such as text).

SUMMARY

Embodiments of the present disclosure provide a data processing system. According to some aspects, the data processing system receives an input text prompt and identifies at least one stored text prompt that is similar to the input text prompt. In some cases, the data processing system uses an image generation model to generate a first intermediate noise state based on the input text prompt. In some cases, the data processing apparatus identifies a stored intermediate noise state corresponding to the at least one similar text prompt. In some cases, the data processing system uses the image generation model to generate a synthetic image based on the stored intermediate noise state.

Accordingly, in some cases, by generating the synthetic image based on the stored intermediate noise state, the image generation model is able to skip a portion of an image generation process, thereby saving processing time and expense and without negatively affecting the quality of the synthetic image. Furthermore, by first identifying the at least one stored text prompt that is similar to the input text prompt, and identifying a stored intermediate noise state corresponding to the at least one stored text prompt, the data processing system both narrows down possible candidates for the stored intermediate noise state, further reducing a processing time and increasing an efficiency of the data processing system, and identifies a stored intermediate noise state that is likely to correspond to content described by the input text prompt.

According to some aspects, the data processing system queries a database using a text embedding and a first intermediate noise state. In some cases, the data processing system first identifies a set of objects in the database, where each object of the set of objects includes a text embedding that is similar to the query text embedding. In some cases, the data processing system then selects an object from the set of objects based on a similarity between the first intermediate noise state and an intermediate noise state stored in the object. In some cases, the data processing system returns at least a portion of the selected object as a search result for the query. Accordingly, in some cases, by identifying the selected object using both the text embedding and the first intermediate noise state, the data processing apparatus is able to retrieve a more accurate search result than searching by text embedding or noise state alone.

A method, apparatus, non-transitory computer readable medium, and system for data processing are described. One or more aspects of the method, apparatus, non-transitory computer readable medium, and system include obtaining a text prompt; generating a first intermediate noise state based on the text prompt; retrieving a second intermediate noise state based on the text prompt and the first intermediate noise state; and generating a synthetic image based on the text prompt and the second intermediate noise state.

A method, apparatus, non-transitory computer readable medium, and system for data processing are described. One or more aspects of the method, apparatus, non-transitory computer readable medium, and system include obtaining a query comprising a text embedding and a first intermediate noise state; selecting a plurality of candidate objects based on the text embedding, wherein each of the plurality of candidate objects includes a candidate text embedding and at least one candidate intermediate noise state; selecting a candidate object from the plurality of candidate objects based on the first intermediate noise state; and providing a search result in response to the query based on the candidate object.

An apparatus and system for data processing are described. One or more aspects of the apparatus and system include at least one memory component; at least one processor executing instructions stored in the at least one memory component; and a query component configured to obtain a query comprising a text embedding and a first intermediate noise state; select a plurality of candidate objects based on the text embedding, wherein each of the plurality of candidate objects includes a candidate text embedding and at least one candidate intermediate noise state; select a candidate object from the plurality of candidate objects based on the first intermediate noise state; and provide a search result in response to the query based on the candidate object.

BRIEF DESCRIPTION OF THE DRAWINGS

FIG. 9 shows an example of an object according to aspects of the present disclosure.

FIG. 12 shows an example of a method for providing a search result according to aspects of the present disclosure.

DETAILED DESCRIPTION

Figure 1:
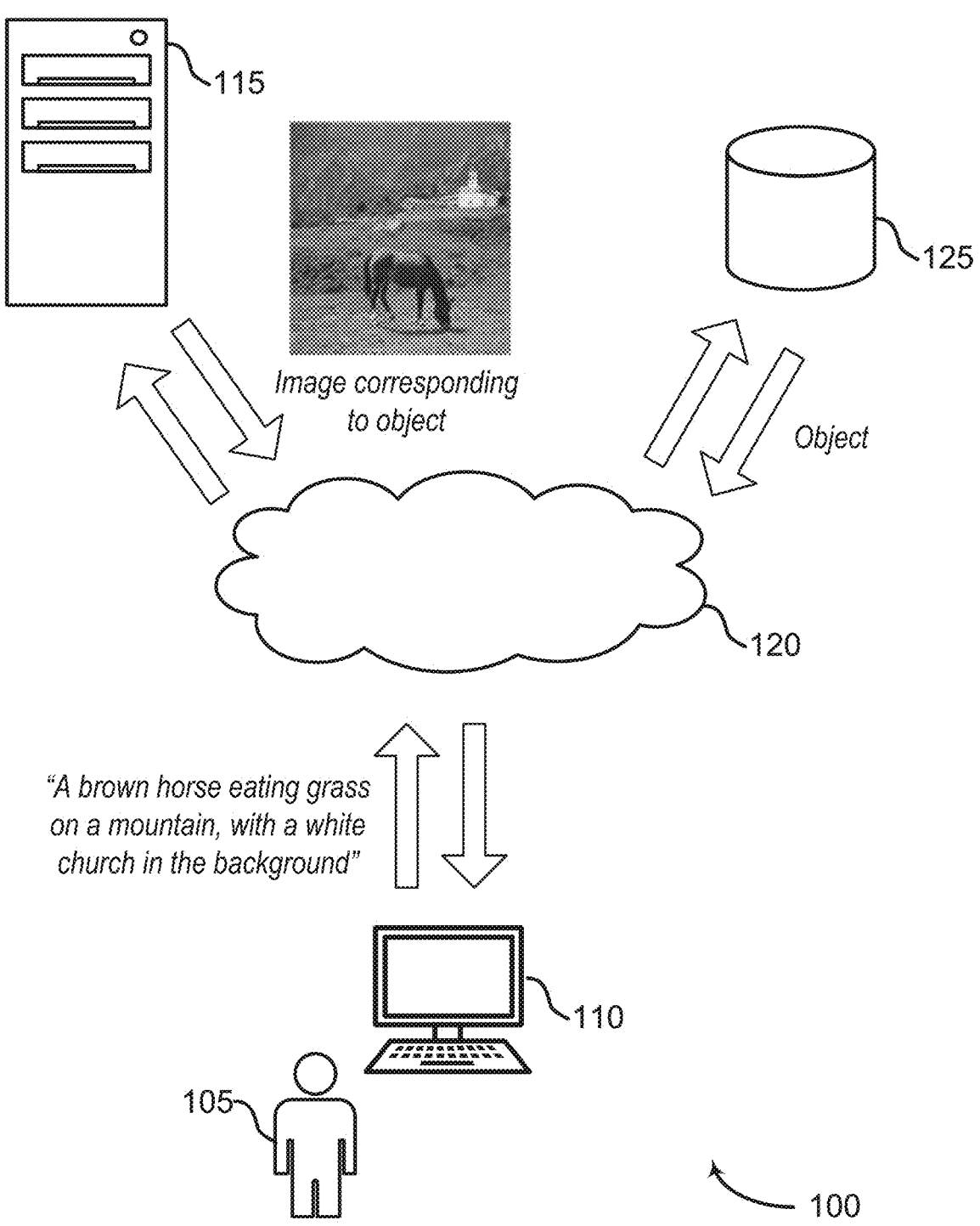
FIG. 1 shows an example of a data processing system according to aspects of the present disclosure.

Information can be provided in multiple modalities, such as a text modality, an image modality, a video modality, and the like. Machine learning algorithms build a model based on sample data, known as training data, to make a prediction or a decision in response to an input without being explicitly programmed to do so. One area of application for machine learning is information retrieval. For example, a machine learning model can be trained to retrieve information provided in one modality (such as an image) based on an input provided in a different modality (such as text).

One method of retrieving an image in response to a text input is by generating the image based on the text input. Some image generation models generate images by gradually removing noise from noisy images or noisy image features, guided by the text input, until a noise-free image is obtained. Generating images by denoising (e.g., by diffusion) can produce high-quality images which have a high degree of fidelity to content described by the text input.

However, such an image generation process is computationally expensive and time-consuming, and each step of the process increases the expense and length of the process. Some data processing systems attempt to decrease the length of an image generation process by training an image generation model used in the process to be more efficient. However, re-training an image generation model or training the image generation model from scratch is expensive, and the expense increases along with the size and complexity of the image generation model.

Other conventional data processing systems attempt to skip steps of the image generation process by performing a few steps of the image generation process to obtain a first intermediate noise state, retrieving an existing intermediate noise state from a database based on the first intermediate noise state, where the existing intermediate noise state corresponds to a later step of the image generation process, and generating an image by denoising the existing intermediate noise state or an intermediate noise state associated with the existing intermediate noise state. However, skipping image generation steps based only on a correlation between two intermediate noise states tends to result in images that do not accurately reflect content described by an input text prompt.

According to some aspects, a data processing system receives an input text prompt and identifies at least one stored text prompt that is similar to the input text prompt. In some cases, the data processing system uses an image generation model to generate a first intermediate noise state based on the input text prompt. In some cases, the data processing apparatus identifies a stored intermediate noise state corresponding to the at least one similar text prompt. In some cases, the data processing system uses the image generation model to generate a synthetic image based on the stored intermediate noise state.

Accordingly, in some cases, by generating the synthetic image based on the stored intermediate noise state, the image generation model is able to skip a portion of an image generation process, thereby saving processing time and expense and without negatively affecting the quality of the synthetic image. Furthermore, by first identifying the at least one stored text prompt that is similar to the input text prompt, and identifying a stored intermediate noise state corresponding to the at least one stored text prompt, the data processing system both narrows down possible candidates for the stored intermediate noise state, further reducing a processing time and increasing an efficiency of the data processing system, and identifies a stored intermediate noise state that is more likely to correspond to content described by the input text prompt than a stored intermediate noise state found by a noise-based retrieval approach alone.

According to some aspects, a data processing system queries a database using a text embedding and a first intermediate noise state. In some cases, the data processing system first identifies a set of objects in the database, where each object of the set of objects includes a text embedding that is similar to the query text embedding. In some cases, the data processing system then selects an object from the set of objects based on a similarity between the first intermediate noise state and an intermediate noise state stored in the object. In some cases, the data processing system returns at least a portion of the selected object as a search result for the query. Accordingly, in some cases, by identifying the selected object using both the text embedding and the first intermediate noise state, the data processing apparatus is able to retrieve a more accurate search result than searching by text embedding or noise state alone.

An example of the data processing system is used in a multi-modal image generation context. For example, a user provides a text prompt to the data processing system. The data processing system finds, based on both the text prompt and a first intermediate noise state generated based on the text prompt, a second intermediate noise state stored in a database, where the first intermediate noise state corresponds to an early step (e.g., a fourth step) of a first image generation process and the second intermediate noise state corresponds to a subsequent step (e.g., a sixteenth step) of a second image generation process having a same number of steps (e.g., 50) as the first image generation process.

The data processing system generates a synthetic image by denoising the second intermediate noise state and provides the synthetic image to the user. In the example, the data processing system obtains a synthetic image using only 38 image generation steps, instead of 50 image generation steps, and the synthetic image has a similar quality and depiction of content described by the text prompt as an image that were to be generated using the full 50 image generation steps.

An example of the data processing system is used in a multi-modal search result retrieval context. For example, the data processing system queries a database using a text embedding of a text prompt and a first intermediate noise state generated based on the text embedding. The data processing system identifies a set of candidate objects that each include a text embedding that is similar to the text embedding included in the query, and then identifies a candidate object of the set of candidate objects that includes an intermediate noise state that is most similar to the first intermediate noise state included in the query. The data processing system returns a search result (e.g., an image) included in the candidate object.

Figure 2:
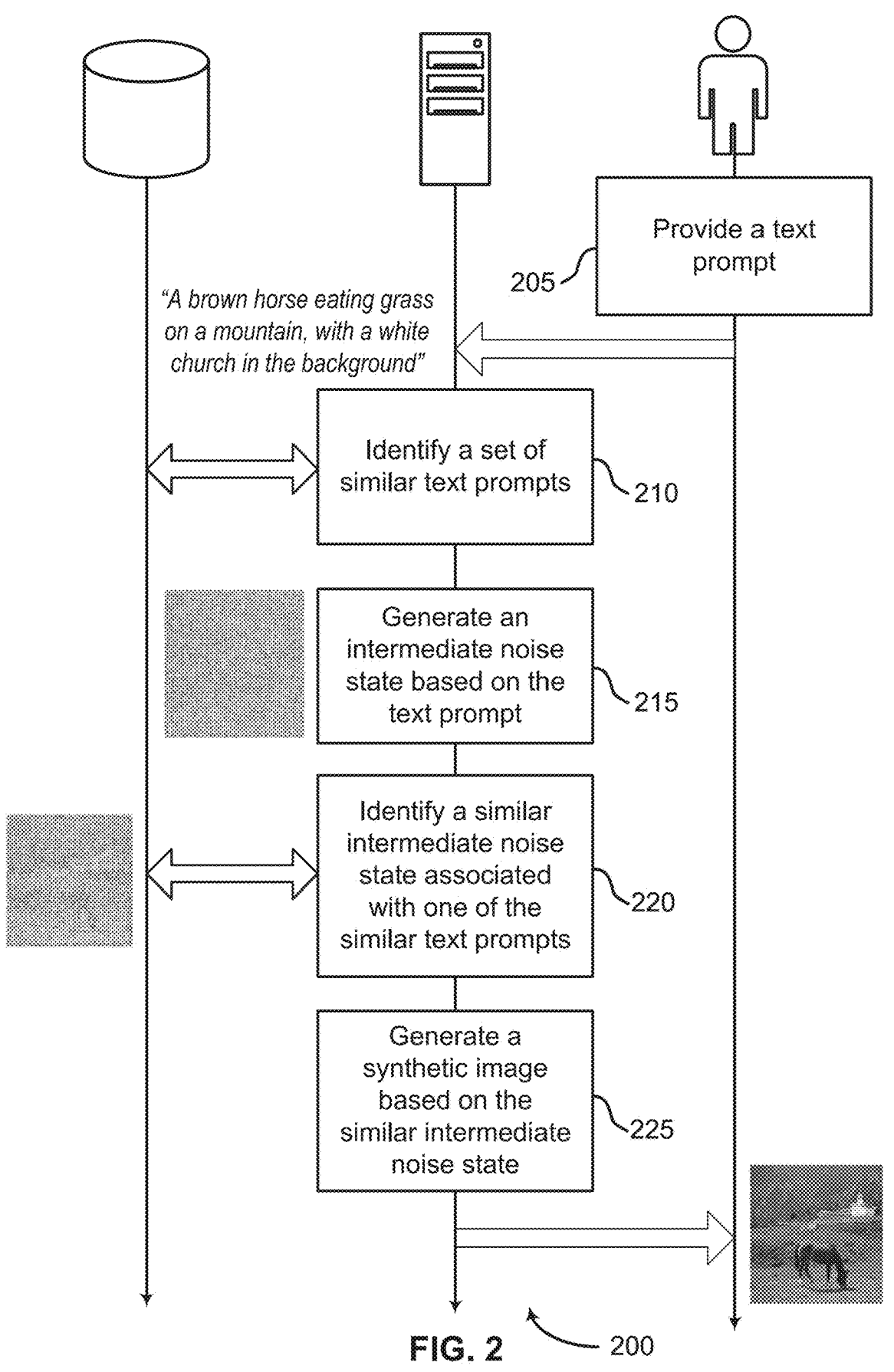
FIG. 2 shows an example of a method for image generation according to aspects of the present disclosure.
Figure 6:
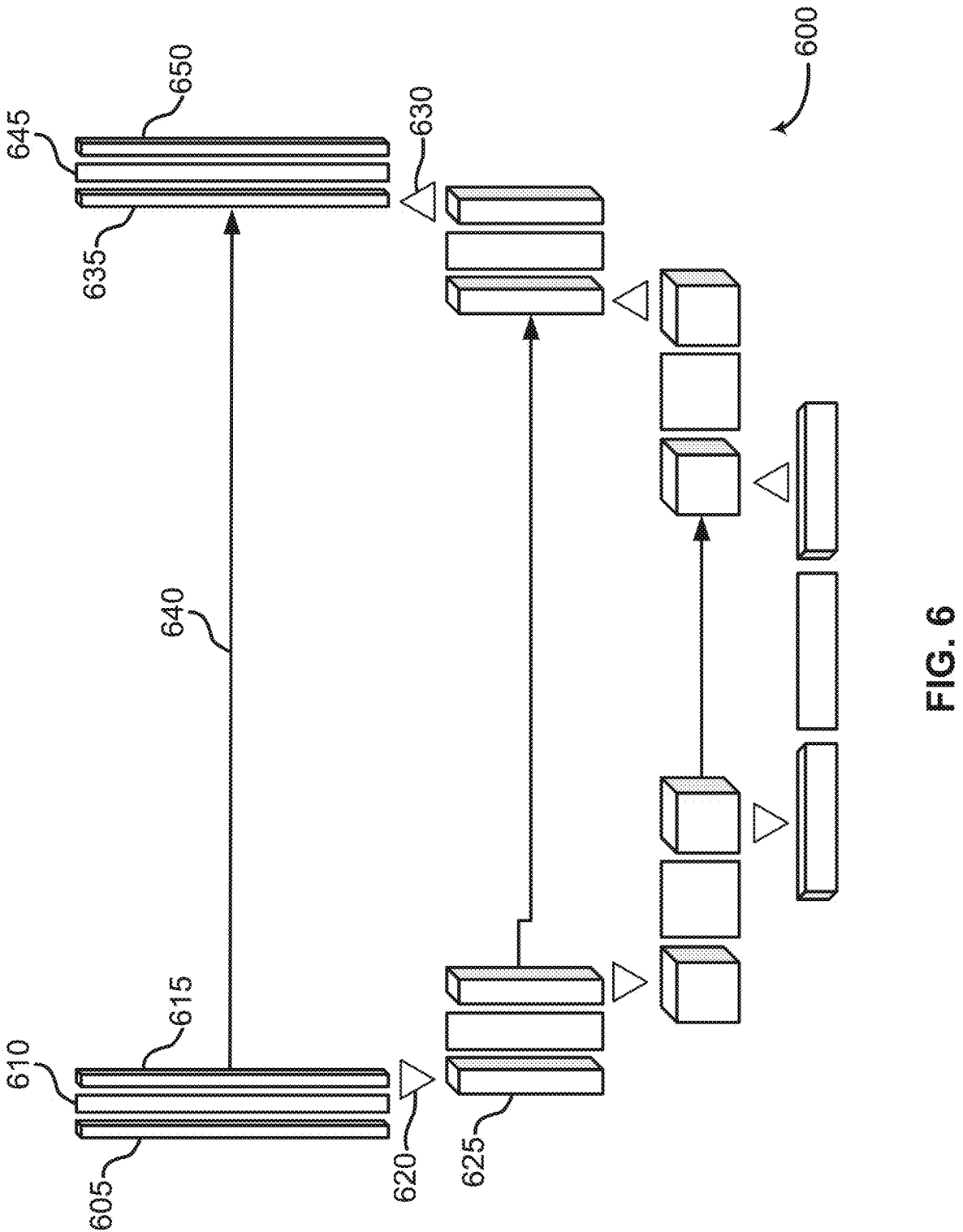
FIG. 6 shows an example of a U-net according to aspects of the present disclosure.
Figure 7:
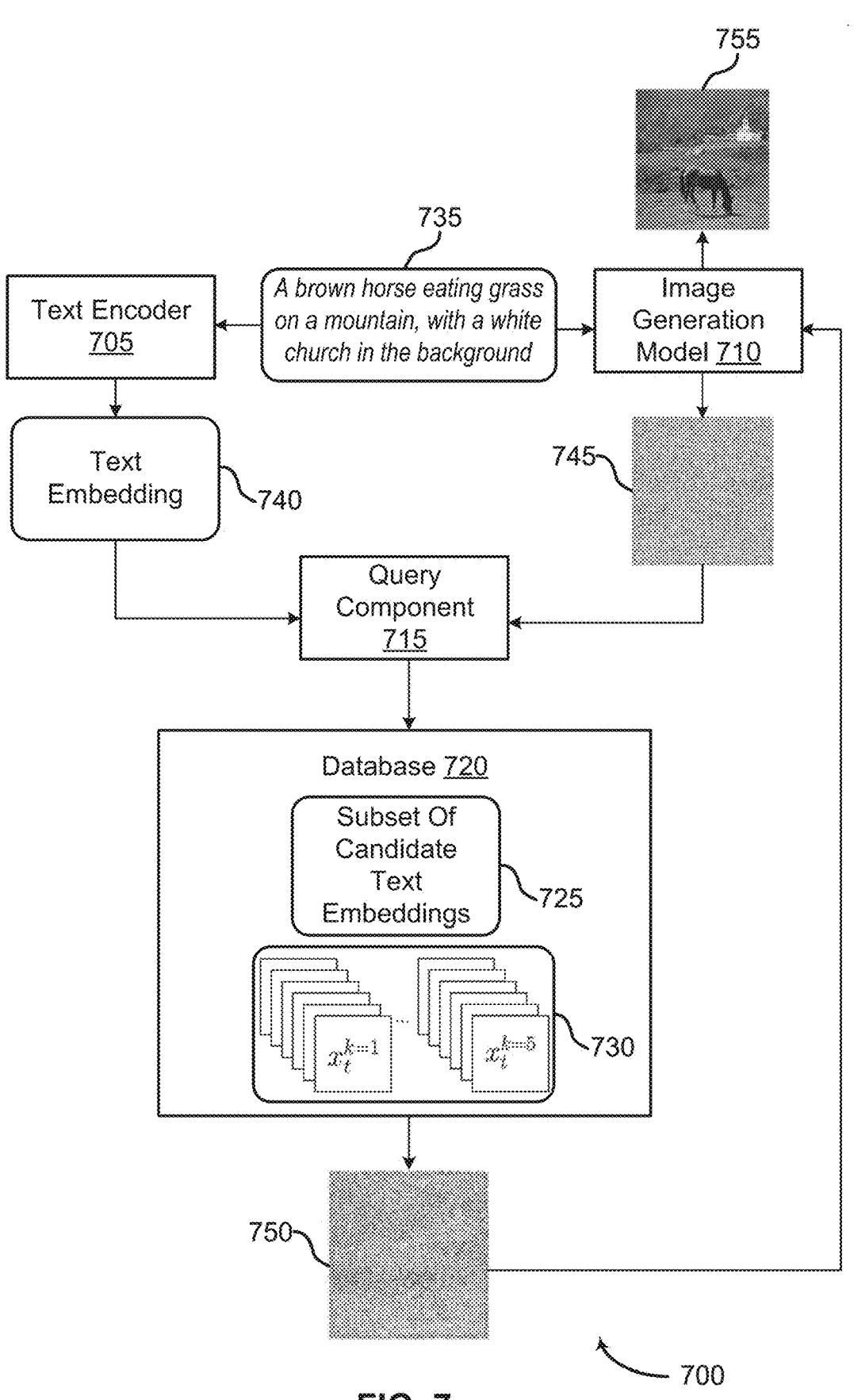
FIG. 7 shows an example of data flow for generating a synthetic image according to aspects of the present disclosure.

Further example applications of the present disclosure in the image generation context are provided with reference to FIGS. 1-2 and 7. Further example applications of the present disclosure in the search result retrieval context are provided with reference to FIGS. 1 and 8-9. Details regarding the architecture of the data processing system are provided with reference to FIGS. 4-9. Examples of a process for data processing are provided with reference to FIGS. 10-12. Examples of a process for training an image generation model are provided with reference to FIG. 13.

Embodiments of the present disclosure improve upon conventional image generation systems by making the image generation process more efficient. For example, some embodiments reduce the number of steps of the generation process while maintaining image quality and fidelity to an input text prompt. Some embodiments achieve this efficiency by retrieving an intermediate noise state corresponding to a subsequent image generation step from a database based on a comparison with both the text prompt and an earlier intermediate noise state corresponding to an earlier image generation step.

By contrast, some conventional image generation processes attempt to reduce a number of image generation steps by retrieving a subsequent image generation step based on a comparison with an earlier image generation step alone, which is a more time-consuming search process than the methods described herein, and also results in a less text-accurate and/or lower-quality image than the synthetic image described herein.

Some embodiments of the present disclosure improve upon conventional text-to-image search systems by retrieving a more accurate search result in response to a text input. For example, some embodiments of the present disclosure obtain a search result based on a comparison of both a text prompt and an intermediate noise state corresponding to an image generation step. By contrast, some conventional text-to-image search systems find an image based on a comparison between an embedding of a text input and an embedding of an image, which provides a less accurate search result than the search result described herein.

Data Processing System

A system and an apparatus for data processing is described with reference to FIGS. 1-9. One or more aspects of the system and the apparatus include at least one memory component; at least one processor executing instructions stored in the at least one memory component; and a query component configured to: obtain a query comprising a text embedding and a first intermediate noise state; select a plurality of candidate objects based on the text embedding, wherein each of the plurality of candidate objects includes a candidate text embedding and at least one candidate intermediate noise state; select a candidate object from the plurality of candidate objects based on the first intermediate noise state; and provide a search result in response to the query based on the candidate object.

Some examples of the system and the apparatus further include a database storing the plurality of candidate objects. Some examples of the system and the apparatus further include an image generation model comprising image generation parameters stored in the at least one memory component, wherein the image generation model is trained to generate the first intermediate noise state and to generate a synthetic image based on search result.

FIG. 1 shows an example of a data processing system 100 according to aspects of the present disclosure. The example shown includes data processing system 100, user 105, user device 110, data processing apparatus 115, cloud 120, and database 125. Data processing system 100 is an example of, or includes aspects of, the corresponding element described with reference to FIGS. 7 and 8. User 105 is an example of, or includes aspects of, the corresponding element described with reference to FIG. 8. Data processing apparatus 115 is an example of, or includes aspects of, the corresponding element described with reference to FIG. 4. Database 125 is an example of, or includes aspects of, the corresponding element described with reference to FIGS. 4, 7, and 8.

In the example of FIG. 1, user 105 provides a text prompt (e.g., "a brown horse eating grass on a mountain, with a white church in the background") to data processing apparatus 115 via a user interface (such as the user interface described with reference to FIG. 4) provided on user device 110 by data processing apparatus 115. Data processing apparatus 115 retrieves an object from database 125 based on a comparison of the text prompt and a text prompt included in the object, and a comparison of an intermediate noise state generated based on the text prompt and an intermediate noise state included in the object.

Data processing apparatus 115 displays an image included in or associated with the object to user 105, or generated by data processing apparatus 115 using the intermediate noise state included in the object, via the user interface. In some cases, data processing apparatus 115 generates the image using information stored in the object as described with reference to FIGS. 7 and 10-11. In some cases, the image is included in the object, and data processing apparatus 115 retrieves the image as described with reference to FIGS. 8 and 12.

As used herein, a "text prompt" refers to a text string. In some cases, a text prompt includes a description of intended content of an image to be generated or retrieved based on the text prompt.

As used herein, an "intermediate noise state" refers to an image (or image features) that is generated at an image generation step of an iterative image generation process (such as a reverse diffusion process).

As used herein, an "object" refers to a collection of associated data, or a data record, that is stored in a database.

As used herein, a "text embedding" refers to a representation of a text input in a lower-dimensional space such that semantic information about the text input is more easily captured and analyzed by a machine learning model. For example, in some cases, a text embedding is a numerical representation of a text prompt in a continuous vector space in which text prompts that include similar semantic information to each other correspond to vectors that are numerically similar to and thus "closer" to each other, thereby allowing a similarity different text prompts corresponding to different embeddings to be readily determined.

As used herein, a "synthetic image" refers to an image generated by an image generation model.

According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by data processing apparatus 115. In some aspects, the user interface allows information (such as an image, a prompt, user inputs, etc.) to be communicated between user 105 and data processing apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

According to some aspects, data processing apparatus 115 includes a computer-implemented network. In some embodiments, the computer-implemented network includes a machine learning model (such as the image generation model described with reference to FIGS. 4-7). In some embodiments, data processing apparatus 115 also includes one or more processors, a memory subsystem, a communication interface, an I/O interface, one or more user interface components, and a bus as described with reference to FIG. 13. Additionally, in some embodiments, data processing apparatus 115 communicates with user device 110 and database 125 via cloud 120.

In some cases, data processing apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of data processing apparatus 115 is provided with reference to FIGS. 4-9 and 14. Further detail regarding a process for image generation is provided with reference to FIGS. 2-3 and 10-11. Further detail regarding a process for retrieving a search result are provided with reference to FIG. 12. Examples of a process for training an image generation model are provided with reference to FIG. 13.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if the server has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, data processing apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to data processing apparatus 115 and communicates with data processing apparatus 115 via cloud 120. According to some aspects, database 125 is included in data processing apparatus 115.

FIG. 2 shows an example of a method 200 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In the example of FIG. 2, a data processing system (such as the data processing system described with reference to FIGS. 1 and 7-8) accelerates an image generation process by retrieving a stored intermediate noise state and using the stored intermediate noise state as a starting point for an image generation process, effectively allowing the data processing system to omit intermediate noise states prior to the stored intermediate noise state.

For example, a data processing apparatus of the data processing system (such as the data processing apparatus described with reference to FIGS. 1 and 4) receives an input text prompt (e.g., "a brown horse eating grass on a mountain, with a white church in the background") from a user (such as the user described with reference to FIGS. 1 and 8). The data processing apparatus identifies a set of text prompts that are similar to the input text prompt and are stored in a database (such as the database described with reference to FIGS. 1, 4, and 7-8).

The data processing apparatus then performs one or more steps of an image generation process (e.g., a diffusion process, such as the diffusion process described with reference to FIG. 11) using an image generation model (such as the image generation model described with reference to FIGS. 4-7) to obtain a first intermediate noise state (e.g., a partially denoised image in a pixel space, or an encoded representation of the partially denoised image in a latent space). In an example, the image generation model performs first through fourth steps of the image generation process to obtain the first intermediate noise image.

The data processing apparatus then searches the database for a second intermediate noise state associated with one of the similar text prompts, where the second intermediate noise state is a later step of an image generation process used to generate an image associated with the similar text prompt and the second intermediate noise state. In an example, the second intermediate noise state corresponds to a sixteenth step of an image generation process used to obtain the associated image.

By first finding the set of similar text prompts, and selecting the second intermediate noise state from among intermediate noise states associated with the set of similar text prompts, the data processing apparatus reduces a search time and encourages finding a second intermediate noise image that is compatible with the content described by the input text prompt.

The image generation model then obtains a synthetic image by performing an image generation process starting from the second intermediate noise state and guided by the input text prompt. Because the second intermediate noise state is associated with a similar text prompt to the input text prompt, and the second intermediate noise state is similar to the first intermediate noise state, the second intermediate noise state can be used without negatively affecting a quality of the synthetic image, or altering the intended content of the synthetic image as described by the input text prompt.

In an example in which the first intermediate noise state corresponds to a fourth step of an image generation process, the second intermediate noise state corresponds to a sixteenth step of an image generation process, and the image generation model uses 50 image generation steps to obtain an image of a desired quality, using the second intermediate noise state therefore effectively allows the image generation model to "skip" eleven steps of the image generation process used to obtain the synthetic image, which decreases a total processing time to obtain the synthetic image, decreases an amount of computing resources needed to obtain the synthetic image, and increases an efficiency of the data processing system. In the example, the image generation model uses only 78% of the image generation steps that a conventional image generation process would use (e.g. 38 image generation steps instead of 50 image generation steps).

At operation 205, the user provides a text prompt. In some cases, the operations of this step refer to, or may be performed by, a user as described with reference to FIGS. 1 and 8. In an example, the user provides the text prompt to the data processing apparatus via a user interface (such as the user interface described with reference to FIG. 4) provided by the data processing apparatus on a user device (such as the user device described with reference to FIG. 1).

At operation 210, the system identifies a set of similar text prompts. In some cases, the operations of this step refer to, or may be performed by, a data processing apparatus as described with reference to FIGS. 1 and 4. In an example, the data processing apparatus identifies a set of text prompts that are similar to the text prompt as described with reference to FIGS. 10-11.

At operation 215, the system generates an intermediate noise state based on the text prompt. In some cases, the operations of this step refer to, or may be performed by, a data processing apparatus as described with reference to FIGS. 1 and 4. In an example, the image generation model generates the intermediate noise state as described with reference to FIGS. 10-11.

At operation 220, the system identifies a similar intermediate noise state associated with one of the similar text prompts. In some cases, the operations of this step refer to, or may be performed by, a data processing apparatus as described with reference to FIGS. 1 and 4. In an example, the data processing apparatus identifies a second intermediate noise state that is similar to the intermediate noise state as described with reference to FIGS. 10-11.

At operation 225, the system generates a synthetic image based on the similar intermediate noise state. In some cases, the operations of this step refer to, or may be performed by, a data processing apparatus as described with reference to FIGS. 1 and 4. In an example, the image generation model generates the synthetic image by iteratively denoising the second intermediate noise state based on the text prompt as described with reference to FIGS. 10-11. In an example, the data processing apparatus displays the synthetic image to the user via the user interface.

Figure 3:
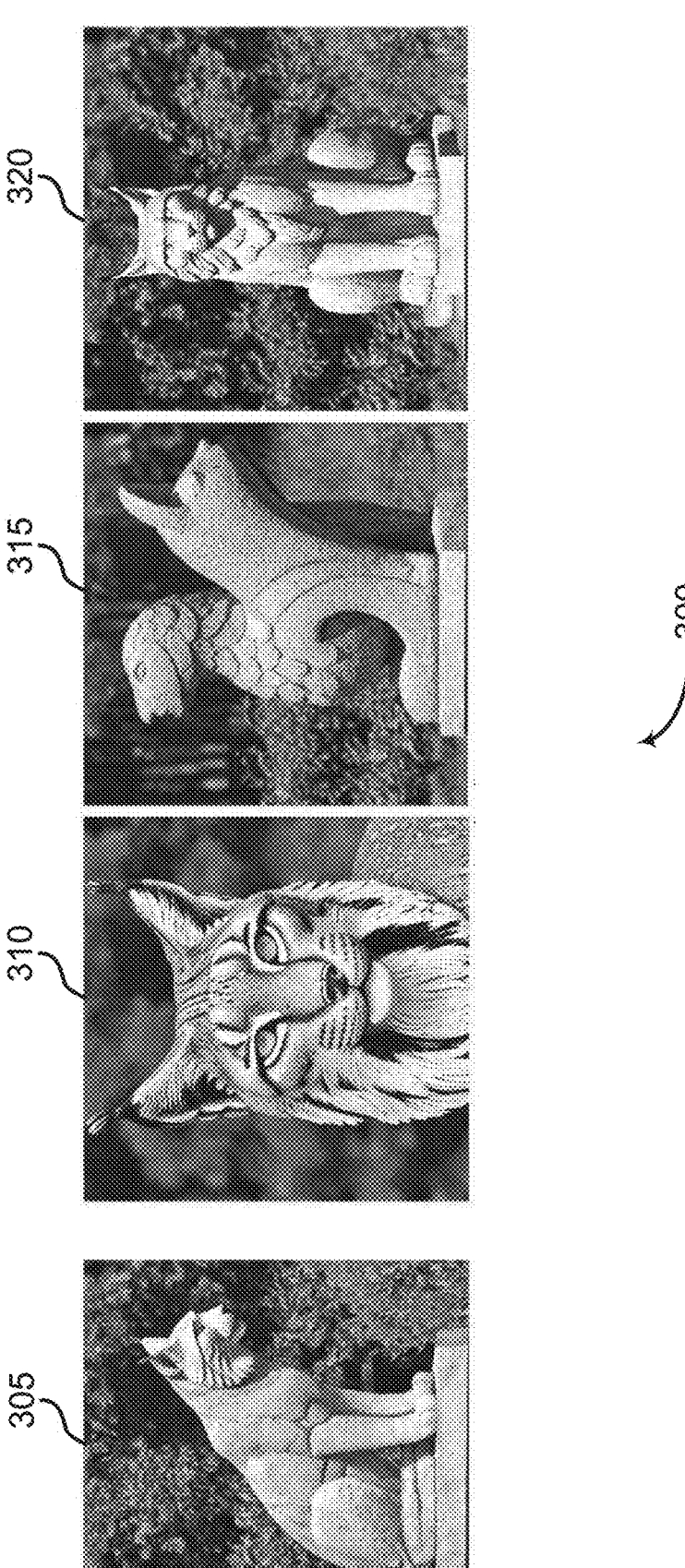
FIG. 3 shows an example of a synthetic image according to aspects of the present disclosure.

FIG. 3 shows an example 300 of a synthetic image according to aspects of the present disclosure. The example 300 shown includes ground-truth image 305, first comparative image 310, second comparative image 315, and synthetic image 320. Synthetic image 320 is an example of, or includes aspects of, the corresponding element described with reference to FIG. 7.

Referring to FIG. 3, ground-truth image 305 is an example of a synthetic image generated by an image generation model (such as the image generation model described with reference to FIGS. 4-7) using a ground-truth image generation process including 50 diffusion steps and based on a text prompt "statue of a lynx". First comparative image 310 is an example of a synthetic image generated by the image generation model using 34 diffusion steps, based on the text prompt and an intermediate noise state retrieved based on an association with a candidate text prompt that is determined to be most similar to the text prompt (e.g., a text-only retrieval process). Second comparative image 315 is an example of a synthetic image generated by the image generation model using 38 diffusion steps, based on an intermediate noise state that is retrieved based on a similarity to an earlier intermediate noise state of the ground-truth image generation process (e.g., a noise-only retrieval process).

Synthetic image 320 is an example of a synthetic image generated by the image generation model using 38 diffusion steps, based on the text prompt and an intermediate noise state retrieved based on both an association with candidate text prompts that are determined to be similar to the text prompt, and a similarity to an earlier intermediate noise state of the ground-truth image generation process (e.g., a text and noise retrieval process).

As shown in FIG. 3, synthetic image 320 is a close match to both ground-truth image 305 and the text prompt "statue of a lynx", while first comparative image 310 does not depict a statue and second comparative image 315 does not depict a statue of a lynx. Accordingly, in some cases, accelerating an image generation process based on a text-and-noise retrieval method achieves superior results over text retrieval or noise retrieval alone.

Figure 4:
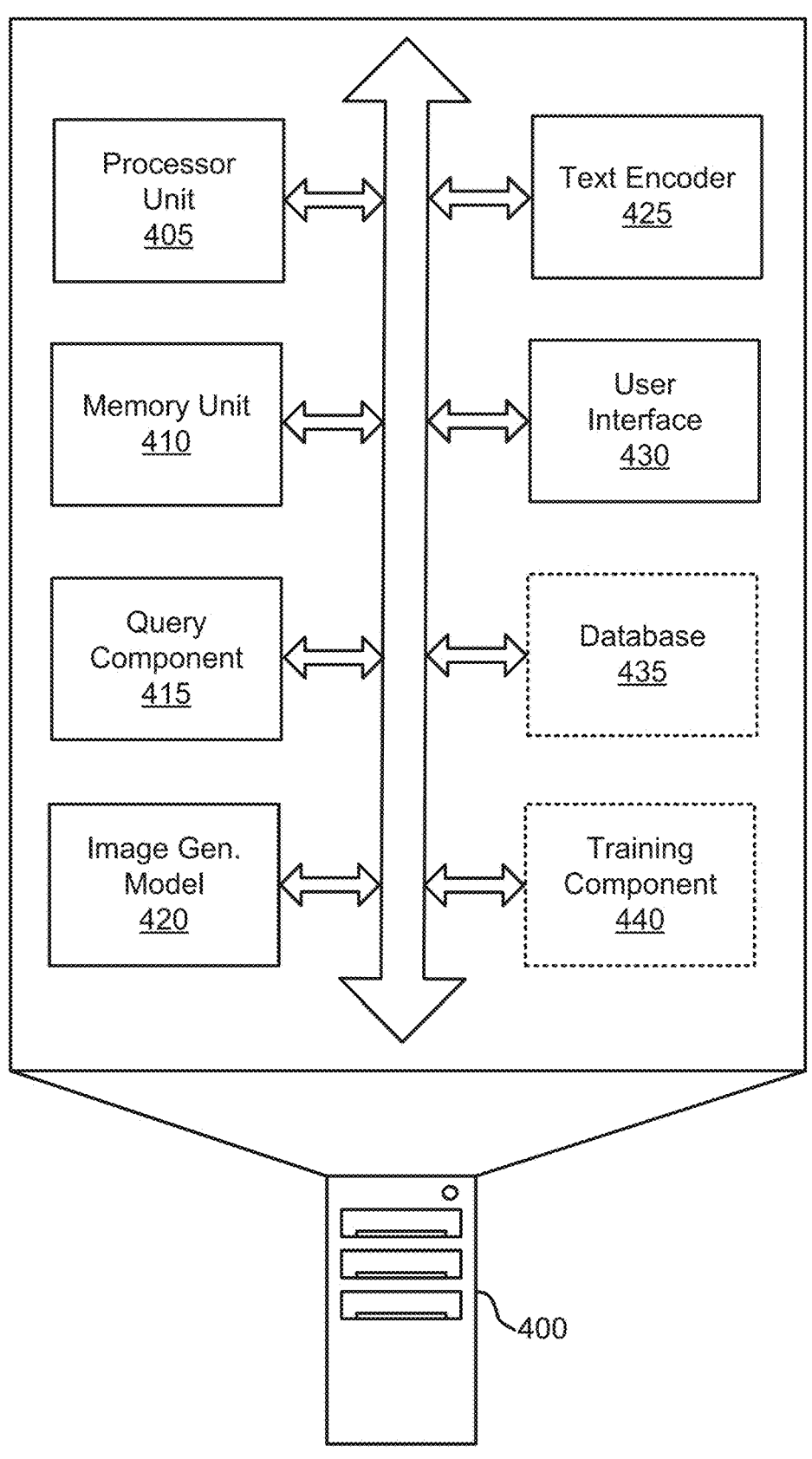
FIG. 4 shows an example of a data processing apparatus according to aspects of the present disclosure.

FIG. 4 shows an example of a data processing apparatus 400 according to aspects of the present disclosure. Data processing apparatus 400 is an example of, or includes aspects of, the corresponding element described with reference to FIG. 1. In one aspect, data processing apparatus 400 includes processor unit 405, memory unit 410, query component 415, image generation model 420, text encoder 425, user interface 430, database 435, and training component 440.

Processor unit 405 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 405 is configured to operate a memory array using a memory controller. In other cases, a memory controller is integrated into processor unit 405. In some cases, processor unit 405 is configured to execute computer-readable instructions stored in memory unit 410 to perform various functions. In some aspects, processor unit 405 includes special purpose components for modem processing, baseband processing, digital signal processing, or transmission processing. According to some aspects, processor unit 405 comprises the one or more processors described with reference to FIG. 14.

Memory unit 410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 405 to perform various functions described herein.

In some cases, memory unit 410 includes a basic input/output system (BIOS) that controls basic hardware or software operations, such as an interaction with peripheral components or devices. In some cases, memory unit 410 includes a memory controller that operates memory cells of memory unit 410. For example, the memory controller may include a row decoder, column decoder, or both. In some cases, memory cells within memory unit 410 store information in the form of a logical state. According to some aspects, memory unit 410 comprises the memory subsystem described with reference to FIG. 14.

Query component 415 is an example of, or includes aspects of, the corresponding element described with reference to FIGS. 7 and 8. According to some aspects, query component 415 is implemented as software stored in memory unit 410 and executable by processor unit 405, as firmware, as one or more hardware circuits, or as a combination thereof.

According to some aspects, query component 415 obtains a query including a text embedding and a first intermediate noise state. In some examples, query component 415 selects a set of candidate objects based on the text embedding, where each of the set of candidate objects includes a candidate text embedding and at least one candidate intermediate noise state. In some examples, query component 415 selects a candidate object from the set of candidate objects based on the first intermediate noise state. In some examples, query component 415 provides a search result in response to the query based on the candidate object. In some aspects, the search result includes an image generated based on the candidate text embedding. In some aspects, the search result includes a text prompt corresponding to the candidate text embedding.

According to some aspects, query component 415 retrieves a second intermediate noise state from a database 435, where the second intermediate noise state is selected from a set of candidate intermediate noise states based on the text prompt and the first intermediate noise state.

In some examples, query component 415 retrieves the second intermediate noise state by comparing the text embedding to a set of candidate text embeddings corresponding to the set of candidate intermediate noise states, respectively. In some examples, query component 415 retrieves the second intermediate noise state by selecting a subset of the set of candidate intermediate noise states based on the comparison. In some examples, query component 415 retrieves the second intermediate noise state by comparing the first intermediate noise state to each of the subset of the set of candidate intermediate noise states.

In some examples, query component 415 computes a similarity score between the text embedding and each of the set of candidate text embeddings, respectively, where the text embedding is compared based on the similarity score. In some examples, query component 415 identifies a set of candidate objects based on comparing the text embedding, where each of the set of candidate objects includes a candidate text embedding and a set of corresponding intermediate noise states and the subset of the set of candidate intermediate noise states is selected from the set of corresponding intermediate noise states of set of candidate objects.

In some examples, query component 415 retrieves the second intermediate noise state by computing a distance between the first intermediate noise state and one or more of the set of candidate intermediate noise states, where the second intermediate noise state is selected based on the distance. In some examples, query component 415 retrieves the second intermediate noise state by selecting a nearest intermediate noise state based on the distance, where the second intermediate noise state includes a subsequent noise state generated from a same text prompt as the nearest intermediate noise state. In some examples, query component 415 retrieves the second intermediate noise state by determining the subsequent noise state based on a comparison to a subsequent noise state threshold.

According to some aspects, query component 415 selects a plurality of candidate objects based on the text embedding, wherein each of the plurality of candidate objects includes a candidate noise state and a candidate text embedding that is compared to the text embedding. In some cases, responsive to determining that the first intermediate noise state and the candidate noise state of a corresponding candidate object of the plurality of candidate objects satisfies a similarity condition, query component 415 selects the candidate noise state as the second intermediate noise state. In some cases, the similarity condition relates to a similarity between the first intermediate noise state and a corresponding noise state included in a candidate object that includes the candidate noise state.

According to some aspects, query component 415 is configured to: obtain a query comprising a text embedding and a first intermediate noise state; select a plurality of candidate objects based on the text embedding, wherein each of the plurality of candidate objects includes a candidate text embedding and at least one candidate intermediate noise state; select a candidate object from the plurality of candidate objects based on the first intermediate noise state; and provide a search result in response to the query based on the candidate object.

Image generation model 420 is an example of, or includes aspects of, the corresponding element described with reference to FIG. 7. According to some aspects, image generation model 420 is implemented as software stored in memory unit 410 and executable by processor unit 405, as firmware, as one or more hardware circuits, or as a combination thereof. According to some aspects, image generation model 420 comprises image generation parameters (e.g., machine learning parameters) stored in memory unit 410.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, which control a degree of connections between neurons and influence the neural network's ability to capture complex patterns in data.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, the node processes the signal and then transmits the processed signal to other connected nodes.

In some cases, the signals between nodes comprise real numbers, and the output of each node is computed by a function of the sum of the inputs of each node. In some examples, nodes may determine the output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to increase the accuracy of the result (e.g., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, image generation model 420 comprises one or more ANNs trained to generate the first intermediate noise state and to generate a synthetic image based on search result. According to some aspects, image generation model 420 comprises one or more ANNs trained to generate a synthetic image, an intermediate noise state (e.g., an intermediate noise image), or a combination thereof.

In some examples, image generation model 420 generates a first intermediate noise state based on a text prompt. In some examples, image generation model 420 generates a synthetic image based on the text prompt and the second intermediate noise state.

In some examples, image generation model 420 generates the first intermediate noise state by obtaining an initial noise state. In some examples, image generation model 420 generates the first intermediate noise state by performing reverse diffusion to remove noise from the initial noise state. In some examples, image generation model 420 generates the synthetic image by performing reverse diffusion to remove noise from the second intermediate noise state.

In some examples, image generation model 420 generates the set of candidate intermediate noise states based on a set of text prompts, respectively. In some aspects, the first intermediate noise state corresponds to a first diffusion time step and the second intermediate noise state corresponds to a second diffusion time step that is greater than the first diffusion time step.

According to some aspects, image generation model 420 generates a set of candidate intermediate noise states based on the set of candidate text embeddings, respectively, where the set of candidate objects includes the set of candidate text embeddings and the set of candidate intermediate noise states. In some examples, image generation model 420 generates a synthetic image based on the text embedding and the at least one candidate intermediate noise state in response to the search result, where the at least one candidate intermediate noise state is included in the search result. In some examples, image generation model 420 generates the first intermediate noise state based on the text embedding.

In some cases, image generation model 420 comprises a diffusion model (such as the diffusion model described with reference to FIG. 5). According to some aspects, the diffusion model implements a reverse diffusion process (such as the reverse diffusion process described with reference to FIG. 11). In some cases, image generation model 420 includes a U-Net (such as a U-Net described with reference to FIG. 6).

Text encoder 425 is an example of, or includes aspects of, the corresponding element described with reference to FIGS. 5 and 7. According to some aspects, text encoder 425 is implemented as software stored in memory unit 410 and executable by processor unit 405, as firmware, as one or more hardware circuits, or as a combination thereof. According to some aspects, text encoder 425 comprises encoding parameters (e.g., machine learning parameters) stored in memory unit 410. According to some aspects, text encoder 425 comprises one or more ANNs trained to generate a text embedding based on a text input.

According to some aspects, text encoder 425 encodes the text prompt to obtain a text embedding. According to some aspects, text encoder 425 obtains a set of text prompts. In some examples, text encoder 425 encodes the set of text prompts to obtain a set of candidate text embeddings. In some examples, text encoder 425 generates the text embedding based on an input text prompt.

According to some aspects, text encoder 425 comprises a transformer. In some cases, a transformer comprises one or more ANNs (such as a U-Net) comprising attention mechanisms that enable the transformer to weigh an importance of different words or tokens within a sequence. In some cases, a transformer processes entire sequences simultaneously in parallel, making the transformer highly efficient and allowing the transformer to capture long-range dependencies more effectively.

In some cases, a transformer comprises an encoder-decoder structure. In some cases, the encoder of the transformer processes an input sequence and encodes the input sequence into a set of high-dimensional representations. In some cases, the decoder of the transformer generates an output sequence based on the encoded representations and previously generated tokens. In some cases, the encoder and the decoder are composed of multiple layers of self-attention mechanisms and feed-forward ANNs.

In some cases, the self-attention mechanism allows the transformer to focus on different parts of an input sequence while computing representations for the input sequence. In some cases, the self-attention mechanism captures relationships between words of a sequence by assigning attention weights to each word based on a relevance to other words in the sequence, thereby enabling the transformer to model dependencies regardless of a distance between words.

An attention mechanism is a key component in some ANN architectures, particularly ANNs employed in natural language processing (NLP) and sequence-to-sequence tasks, which allows an ANN to focus on different parts of an input sequence when making predictions or generating output.

NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. In some cases, these models express the relative probability of multiple answers.

Some sequence models (such as RNNs) process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

In some cases, an ANN employing an attention mechanism receives an input sequence and maintains the current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

In some cases, by incorporating an attention mechanism, an ANN dynamically allocates attention to different parts of the input sequence, allowing the ANN to focus on relevant information and capture dependencies across longer distances.

In some cases, calculating attention involves three basic steps. First, a similarity between a query vector Q and a key vector K obtained from the input is computed to generate attention weights. In some cases, similarity functions used for this process include dot product, splice, detector, and the like. Next, a softmax function is used to normalize the attention weights. Finally, the attention weights are weighed together with their corresponding values V. In the context of an attention network, the key K and value V are vectors or matrices that are used to represent the input data. The key K is used to determine which parts of the input the attention mechanism should focus on, while the value V is used to represent the actual data being processed.

According to some aspects, text encoder 425 comprises a large language model (LLM). An LLM is a machine learning model that is designed and/or trained to learn statistical patterns and structures of human language. LLMs are capable of a wide range of language-related tasks such as text completion, question answering, translation, summarization, and creative writing, in response to a prompt. In some cases, the term "large" refers to a size and complexity of the LLM, for example, measured in terms of a number of parameters of the large language model, where more parameters allow an LLM to understand more intricate language patterns and generate more nuanced and coherent text.

According to some aspects, text encoder 425 comprises a CLIP (Contrastive Language-Image Pre-Training) model. In some cases, a CLIP model is one or more ANNs that is pre-trained to efficiently learn visual concepts from natural language supervision. A CLIP model can be instructed in natural language to perform a variety of classification benchmarks without directly optimizing for the benchmarks' performance, in a manner building on "zero-shot" or zero-data learning. A CLIP model can learn from unfiltered, highly varied, and highly noisy data, such as text paired with images found across the Internet, in a similar but more efficient manner to zero-shot learning, thus reducing a need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The CLIP model can then output a linear classifier of CLIP's visual representations.

According to some aspects, text encoder 425 comprises a variational autoencoder (VAE). According to some aspects, a VAE is an ANN trained to encode input data into a lower-dimensional latent space and then decode the encoded input data back into the original input space. In some cases, a VAE differs from other autoencoder implementations by imposing a probabilistic structure on the latent space.

According to some aspects, a key aspect of a VAE lies in the VAE's ability to generate new data samples by sampling from a learned latent space distribution, thereby generating new data points that resemble training data. VAEs are widely used in various applications, including image generation, data compression, and representation learning, due to an ability to learn rich probabilistic representations of high-dimensional data. In some cases, VAEs provide a principled framework for generative modeling and are successful in generating realistic-looking samples across different domains.

According to some aspects, the VAE includes an encoder network that receives input data and outputs a mean vector and a variance vector representing parameters of a probability distribution (such as Gaussian) of the input data in the latent space. In some cases, the VAE samples a latent vector from the mean vector and the variance vector using a reparameterization trick, where the latent vector is obtained by sampling from a standard normal distribution and then scaling and shifting the samples according to the mean vector and the variance vector. According to some aspects, the VAE includes a decoder network that reconstructs the original input data based on the latent vector.

According to some aspects, the VAE is trained by optimizing a loss function that includes a reconstruction loss and a regularization term. In some cases, the reconstruction loss encourages the decoder network to generate an outputs similar to an original input, while the regularization term, such as a Kullback-Leibler (KL) divergence between the learned distribution and the prior distribution, encourages the latent space to follow a specific distribution, typically a standard normal distribution. In some cases, the regularization term helps to ensure that the latent space is well-structured and continuous.

According to some aspects, user interface 430 is implemented as software stored in memory unit 410 and executable by processor unit 405. According to some aspects, user interface 430 is a graphical user interface. According to some aspects, data processing apparatus displays user interface 430 on a user device (such as the user device described with reference to FIG. 1).

According to some aspects, user interface 430 is configured to obtain a text prompt and/or a set of text prompts. According to some aspects, user interface 430 is configured to receive a query or parameters for a query. According to some aspects, user interface 430 is configured to display a synthetic image. According to some aspects, user interface 430 is configured to display a search result.

Database 435 is an example of, or includes aspects of, the corresponding element described with reference to FIGS. 1, 7, and 8. According to some aspects, database 435 stores at least one candidate object. According to some aspects, database 435 is omitted from data processing apparatus 400. According to some aspects, data processing apparatus 400 communicates information with database 435 (for example, as described with reference to FIG. 1).

According to some aspects, database 435 stores at least one candidate text embedding. According to some aspects, database 435 stores at least one candidate intermediate noise state. According to some aspects, database 435 stores multimodal data corresponding to the text prompt, including at least one of the text prompt, the at least one intermediate noise state, a synthetic image, and metadata including at least one of a date, a timestamp, user feedback, and a version number of the image generation model.

According to some aspects, database 435 is implemented as a versatile vector database using Qdrant library that is used to efficiently store and retrieve relevant data. In some cases, unlike vector similarity search libraries such as ScaNN and FAISS, database 435 incorporates traditional database attributes such as CRUD (Create, Read, Update, Delete) operations and metadata support. In some cases, database 435 is continuously updated based on user input, and CRUD operations allow data associated with the user input to be efficiently stored and retrieved.

According to some aspects, training component 440 is implemented as software stored in memory unit 410 and executable by processor unit 405, as firmware, as one or more hardware circuits, or as a combination thereof. According to some aspects, training component 440 is omitted from data processing apparatus 400. According to some aspects, training component 440 is included in a separate apparatus from data processing apparatus 400. According to some aspects, training component 440 implemented as software stored in a memory unit of the separate apparatus and executable by a processor unit of the separate apparatus, as firmware of the separate apparatus, as one or more hardware circuits of the separate apparatus, or as a combination thereof. According to some aspects, data processing apparatus 400 communicates with training component 440 implemented in the separate apparatus to perform the training functions described herein. According to some aspects, training component 440 is configured to train image generation model 420.

Figure 5:
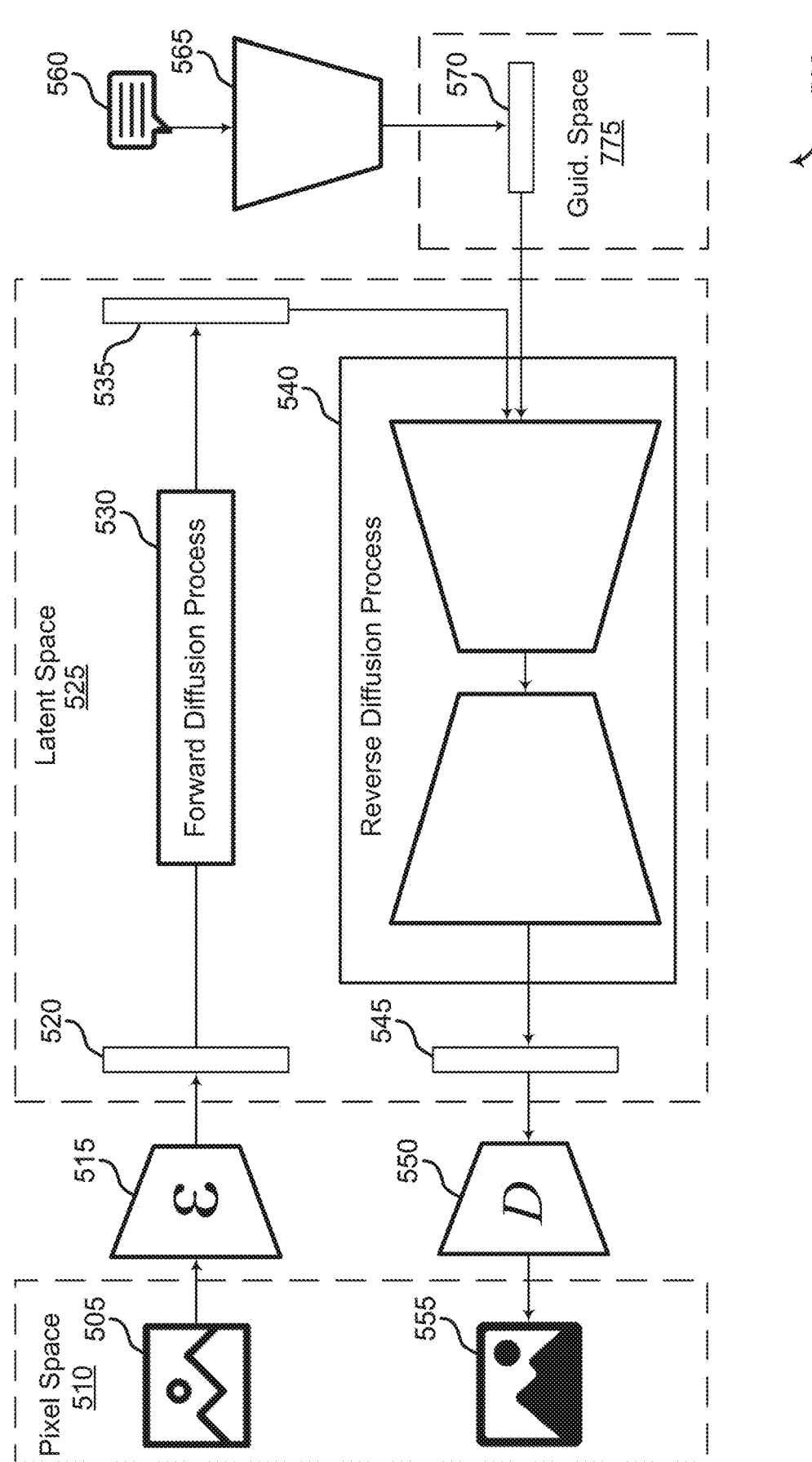
FIG. 5 shows an example of a guided diffusion architecture according to aspects of the present disclosure.

FIG. 5 shows an example of a guided diffusion architecture 500 according to aspects of the present disclosure. The example shown includes guided diffusion architecture 500, original image 505, pixel space 510, image encoder 515, original image features 520, latent space 525, forward diffusion process 530, noisy features 535, reverse diffusion process 540, denoised image features 545, image decoder 550, output image 555, prompt 560, encoder 565, guidance features 570, and guidance space 575.

Diffusion models (such as the image generation model described with reference to FIGS. 4 and 7) are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, or to image features generated by an encoder, as in latent diffusion.

For example, according to some aspects, image encoder 515 encodes original image 505 from pixel space 510 and generates original image features 520 in latent space 525. According to some aspects, forward diffusion process 530 gradually adds noise to original image features 520 to obtain noisy features 535 in latent space 525 at various noise levels. In some cases, forward diffusion process 530 is implemented as the forward diffusion process described with reference to FIG. 11 or 13. In some cases, forward diffusion process 530 is implemented by a data processing apparatus (such as the data processing apparatus described with reference to FIGS. 1 and 4) or by a training component (such as the training component described with reference to FIG. 4).

According to some aspects, reverse diffusion process 540 is applied to noisy features 535 to gradually remove the noise from noisy features 535 at the various noise levels to obtain denoised image features 545 (e.g., intermediate noise states) in latent space 525. In some cases, reverse diffusion process 540 is implemented as the reverse diffusion process described with reference to FIG. 11 or 13. In some cases, reverse diffusion process 540 is implemented by an image generation model (such as the image generation model described with reference to FIGS. 4 and 7). In some cases, reverse diffusion process 540 is implemented by a U-Net ANN included in the image generation model (such as the U-Net ANN described with reference to FIG. 6).

According to some aspects, a training component (such as the training component described with reference to FIG. 4) compares denoised image features 545 to original image features 520 at each of the various noise levels, and updates image generation parameters of the image generation model based on the comparison. In some cases, image decoder 550 decodes denoised image features 545 to obtain output image 555 in pixel space 510. In some cases, an output image 555 is created at each of the various noise levels. In some cases, the training component compares output image 555 to original image 505 to train the diffusion model.

In some cases, image encoder 515 and image decoder 550 are pretrained prior to training the image generation model. In some examples, image encoder 515, image decoder 550, and the image generation model are jointly trained. In some cases, image encoder 515 and image decoder 550 are jointly fine-tuned with the image generation model.

According to some aspects, reverse diffusion process 540 is guided based on a guidance prompt such as prompt 560 (e.g., a text prompt). In some cases, prompt 560 is encoded using encoder 565 (e.g., a text encoder as described with reference to FIGS. 4 and 7) to obtain guidance features 570 (e.g., a text embedding as described herein) in guidance space 575. In some cases, guidance features 570 are combined with noisy features 535 at one or more layers of reverse diffusion process 540 to encourage output image 555 to include content described by prompt 560. For example, guidance features 570 can be combined with noisy features 535 using a cross-attention block within reverse diffusion process 540.

Cross-attention, also known as multi-head attention, is an extension of the attention mechanism used in some ANNs for NLP tasks. In some cases, cross-attention enables reverse diffusion process 540 to attend to multiple parts of an input sequence simultaneously, capturing interactions and dependencies between different elements. In cross-attention, there are two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences (such as a relative position of an objective text and a text prompt within prompt 560), allowing reverse diffusion process 540 to understand the context and generate more accurate and contextually relevant outputs.

According to some aspects, image encoder 515 and image decoder 550 are omitted, and forward diffusion process 530 and reverse diffusion process 540 occur in pixel space 510. For example, in some cases, forward diffusion process 530 adds noise to original image 505 to obtain noisy images (e.g., intermediate noise states) in pixel space 510, rather than noisy image features in a latent space, and reverse diffusion process 540 gradually removes noise from the noisy images to obtain output image 555 in pixel space 510.

FIG. 6 shows an example of a U-Net 600 according to aspects of the present disclosure. The example shown includes U-Net 600, input features 605, initial neural network layer 610, intermediate features 615, down-sampling layer 620, down-sampled features 625, up-sampling process 630, up-sampled features 635, skip connection 640, final neural network layer 645, and output features 650.

According to some aspects, an image generation model (such as the image generation model described with reference to FIGS. 4 and 7) comprises an ANN architecture known as a U-Net. In some cases, U-Net 600 implements the reverse diffusion process described with reference to FIG. 11 or 13.

According to some aspects, U-Net 600 receives input features 605, where input features 605 include an initial resolution and an initial number of channels, and processes input features 605 using an initial neural network layer 610 (e.g., a convolutional neural network layer) to produce intermediate features 615.

In some cases, intermediate features 615 are then down-sampled using a down-sampling layer 620 such that down-sampled features 625 have a resolution less than the initial resolution and a number of channels greater than the initial number of channels.

In some cases, this process is repeated multiple times, and then the process is reversed. For example, down-sampled features 625 are up-sampled using up-sampling process 630 (or an up-sampling layer) to obtain up-sampled features 635. In some cases, up-sampled features 635 are combined with intermediate features 615 having a same resolution and number of channels via skip connection 640. In some cases, the combination of intermediate features 615 and up-sampled features 635 are processed using final neural network layer 645 to produce output features 650. In some cases, output features 650 have the same resolution as the initial resolution and the same number of channels as the initial number of channels.

According to some aspects, U-Net 600 receives additional input features to produce a conditionally generated output. In some cases, the additional input features include a vector representation of an input prompt. In some cases, the additional input features are combined with intermediate features 615 within U-Net 600 at one or more layers. For example, in some cases, a cross-attention module is used to combine the additional input features and intermediate features 615.

FIG. 7 shows an example of data flow for generating a synthetic image 755 according to aspects of the present disclosure. The example shown includes data processing system 700, prompt 735, text embedding 740, first intermediate noise state 745, second intermediate noise state 750, and synthetic image 755. Data processing system 700 is an example of, or includes aspects of, the corresponding element described with reference to FIGS. 1 and 8.

In one aspect, data processing system 700 includes text encoder 705, image generation model 710, query component 715, and database 720. Text encoder 705 is an example of, or includes aspects of, the corresponding element described with reference to FIG. 4. Image generation model 710 is an example of, or includes aspects of, the corresponding element described with reference to FIG. 4. Query component 715 is an example of, or includes aspects of, the corresponding element described with reference to FIGS. 4 and 8. Database 720 is an example of, or includes aspects of, the corresponding element described with reference to FIGS. 1, 4, and 8. In one aspect, database 720 includes subset of candidate text embeddings 725 and candidate intermediate noise states 730.

Text embedding 740 is an example of, or includes aspects of, the corresponding element described with reference to FIG. 8. First intermediate noise state 745 is an example of, or includes aspects of, the corresponding element described with reference to FIG. 8. Synthetic image 755 is an example of, or includes aspects of, the corresponding element described with reference to FIGS. 3, 12, and 13.

According to some aspects, text encoder 705 generates text embedding 740 based on prompt 735 and provides text embedding 740 to query component 715. In some cases, query component 715 uses text embedding 740 as a query to identify a set of top-k nearest text embeddings (e.g., subset of candidate text embeddings 725) to text embedding 740 among text embeddings stored in database 720. In some cases, each candidate text embedding of the subset of candidate text embeddings (e.g., as shown in FIG. 7, k=[1, 2, . . . 5]) is associated with a set of candidate intermediate noise states $$\{x_t^k\}_{t\in[T,0]}$$

from among candidate intermediate noise states 730, where each set of candidate intermediate noise states includes noise states generated based on the corresponding candidate text embedding (for example, using image generation model 710).

In some cases, each candidate text embedding is included in a candidate object stored in database 720. In some cases, a set of candidate intermediate noise states associated with the candidate text embedding is included in the candidate object. In some cases, database 720 includes a set of candidate objects.

In some cases, image generation model 710 generates first intermediate noise state 745 (e.g., $x_{t=0.9T}$) by executing a reverse diffusion process from an initial reverse diffusion step (e.g., t=T) down to a subsequent diffusion step (e.g., t=0.9 T, rounded to a nearest integer) based on prompt 735. In some cases, query component 715 determines a distance (e.g., an L2 distance) between first intermediate noise state 745 (e.g., $x_{t=0.9T}$) and a corresponding intermediate noise state generated at a corresponding diffusion step from each set of candidate intermediate noise states $$(e.g., x_{t=0.9T}^{k=1} \cdots x_{t=0.9T}^{k=5}).$$

In some cases, query component 715 selects a set of candidate intermediate noise states including the least distant corresponding intermediate noise state as the optimal set of candidate intermediate noise states $$\{\hat{x}_t^k\}_{t\in[T,0]}.$$

In some cases, the optimal set of candidate intermediate noise states $$\{\hat{x}_t^k\}_{t\in[T,0]}$$

is included in an optimal candidate object of the set of candidate objects.

According to some aspects, query component 715 determines that first intermediate noise state 745 and a candidate noise state of a corresponding candidate object of the plurality of candidate objects satisfies a similarity condition.

For example, in some cases, query component 715 determines a similarity (e.g., a cosine similarity) between first intermediate noise state 745 (e.g., $x_{t=0.9T}$) and the corresponding optimal candidate intermediate noise state $$(e.g., \hat{x}_{t=0.9T}^k)$$

from the optimal set of candidate intermediate noise states $$\{\hat{x}_t^k\}_{t\in[T,0]}$$

including the candidate noise state, and determines whether the similarity condition is satisfied based on the similarity.

For example, in some cases, if the similarity is between a first similarity threshold (e.g., 0.72) and a second similarity threshold greater than the first similarity threshold (e.g., 0.92), or if the similarity equal to the second similarity threshold, query component 715 determines that a first similarity condition is satisfied. In some cases, if the similarity is greater than the second similarity threshold, query component 715 determines that a second similarity condition is satisfied. In some cases, if the similarity is equal to or less than the first similarity threshold, query component 715 determines that a third similarity condition is satisfied.

According to some aspects, responsive to determining that first intermediate noise state 745 and the candidate noise state of the corresponding candidate object of the plurality of candidate objects satisfies a similarity condition, query component 715 selects the candidate noise state as second intermediate noise state 750.

For example, in some cases, in response to determining that the first similarity condition is satisfied, query component 715 selects a candidate intermediate noise state of the optimal set of candidate intermediate noise states associated with a first resuming diffusion step (e.g., $$\hat{x}_{t=0.8T}^k,$$

with 0.8 T rounded to the nearest integer) as second intermediate noise state 750.

In some cases, in response to determining that the second similarity condition is satisfied, query component 715 selects a candidate intermediate noise state of the optimal set of candidate intermediate noise states associated with a second resuming diffusion step subsequent to the first resuming diffusion step (e.g., $$\hat{x}_{t=0.7T}^k,$$

with 0.7 T rounded to the nearest integer) as second intermediate noise state 750.

In some cases, in response to determining that the third similarity condition is satisfied, query component 715 selects first intermediate noise state 745 as second intermediate noise state 750.

In some cases, image generation model 710 receives second intermediate noise state 750 as input and generates synthetic image 755 using a reverse diffusion process beginning with second intermediate noise state 750 and guided by text embedding 740.

Figure 8:
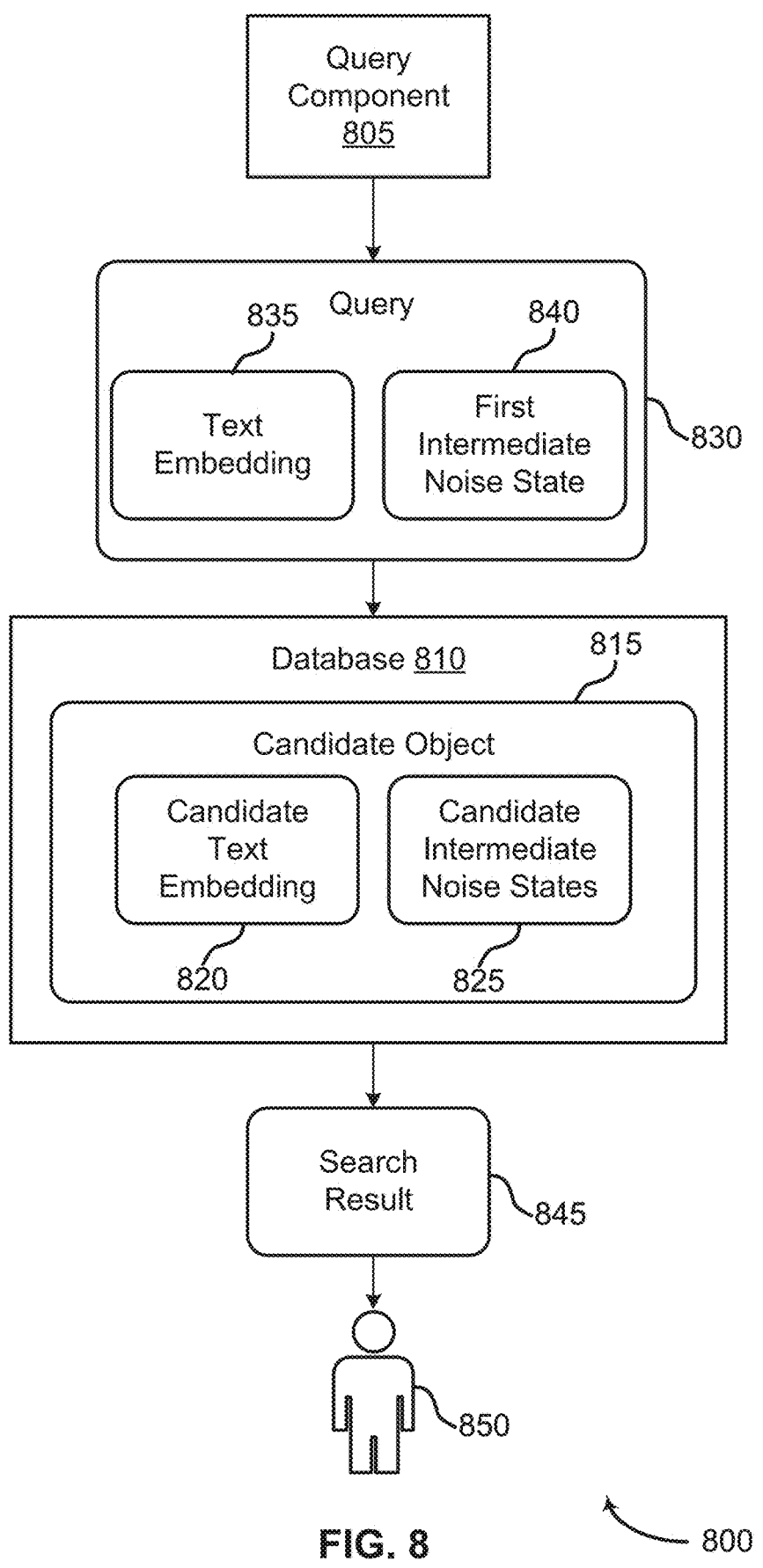
FIG. 8 shows an example of data flow for providing a search result according to aspects of the present disclosure.

FIG. 8 shows an example of data flow for providing a search result 845 according to aspects of the present disclosure. The example shown includes data processing system 800, query 830, search result 845, and user 850. Data processing system 800 is an example of, or includes aspects of, the corresponding element described with reference to FIGS. 1 and 7.

In one aspect, data processing system 800 includes query component 805 and database 810. Query component 805 is an example of, or includes aspects of, the corresponding element described with reference to FIGS. 4 and 7. Database 810 is an example of, or includes aspects of, the corresponding element described with reference to FIGS. 1, 4, and 7. In one aspect, database 810 includes candidate object 815. In one aspect, candidate object 815 includes candidate text embedding 820 and candidate intermediate noise states 825.

In one aspect, query 830 includes text embedding 835 and first intermediate noise state 840. Text embedding 835 is an example of, or includes aspects of, the corresponding element described with reference to FIG. 7. First intermediate noise state 840 is an example of, or includes aspects of, the corresponding element described with reference to FIG. 7. User 850 is an example of, or includes aspects of, the corresponding element described with reference to FIG. 1.

According to some aspects, query component 805 uses query 830 including text embedding 835 and first intermediate noise state 840 to search database 810. In some cases, query component 805 identifies a set of candidate objects (e.g., candidate object 815), each including a candidate text embedding (e.g., candidate text embedding 820) and a set of candidate intermediate noise states $$\{x_t^k\}_{t \in [T, 0]}$$

(e.g., candidate intermediate noise states 825) generated based on the candidate text embedding, by identifying top-k nearest candidate text embeddings to text embedding 835 among candidate text embeddings stored in database 810. An example of an object is described with reference to FIG. 9.

In some cases, first intermediate noise state 840 corresponds to a reverse diffusion step (e.g., $x_{t=0.9T}$, where 0.9 T is rounded to a nearest integer). In some cases, query component 805 determines a distance (e.g., an L2 distance) between first intermediate noise state 840 and a corresponding intermediate noise state generated at a corresponding diffusion step from each set of candidate intermediate noise states associated with the top-k nearest candidate text embeddings $$(e.g., \ x_{t=0.9T}^k).$$

In some cases, query component 805 selects a set of candidate intermediate noise states including the least distant corresponding intermediate noise state as the optimal set of candidate intermediate noise states $$\{\hat{x}_t^k\}_{t \in [T, 0]}$$

(e.g., candidate intermediate noise states 825, corresponding to candidate text embedding 820, included in candidate object 815).

In some cases, query component 805 returns search result 845 to user 850, where search result 845 includes candidate object 815 or information included in candidate object 815. For example, in some cases, candidate object 815 includes a synthetic image generated based on candidate text embedding 820, and search result 845 includes the synthetic image. In some cases, query component 805 provides search result 845 to an image generation model (such as the image generation model described with reference to FIGS. 4 and 7), and the image generation model generates a synthetic image based on information included in search result 845 (e.g., an intermediate noise state) as described with reference to FIGS. 7 and 10-11.

FIG. 9 shows an example of an object 900 according to aspects of the present disclosure. Object 900 is an example of, or includes aspects of, the candidate object described with reference to FIG. 8.

Referring to FIG. 9, object 900 is stored in a database (such as the database described with reference to FIGS. 1, 4, and 7-8). In some cases, object 900 is a data record. In some cases, the database is a vector database. In some cases, object 900 comprises a vector embedding (e.g., an embedding of a text prompt), where the vector embedding is used for similarity searches.

In some cases, object 900 includes a text prompt. In some cases, object 900 includes a text embedding of the text prompt of object 900. In some cases, object 900 includes a set of intermediate noise states. In some cases, object 900 includes an image. In some cases, the image of object 900 is generated based on the text embedding of object 900 and the set of intermediate noise states of object 900. In some cases, the text embedding of object 900 is generated by a text encoder (such as the text encoder described with reference to FIGS. 4 and 7). In some cases, the set of intermediate noise states and the image of object 900 are generated by an image generation model (such as the image generation model described with reference to FIGS. 4-7).

In some cases, object 900 includes metadata. In some cases, the metadata includes a text prompt stored as a text string, a URL for intermediate noise states generated during an image generation process (e.g., a diffusion process) of an image generation model (such as the image generation model described with reference to FIGS. 4-7), a URL for a synthetic image generated based on the text prompt and the intermediate noise states, a configuration file (e.g., a JSON file) for the image generation model, and/or a combination thereof. In some cases, the URL for the intermediate noise states and the URL for the synthetic image direct to intermediate noise states and a synthetic image, respectively, stored in a different database or in a cloud (such as the cloud described with reference to FIG. 1).

Image Generation

A method for data processing is described with reference to FIGS. 10-11. One or more aspects of the method include obtaining a text prompt; generating a first intermediate noise state based on the text prompt; retrieving a second intermediate noise state from a database, wherein the second intermediate noise state is selected from a plurality of candidate intermediate noise states based on the text prompt and the first intermediate noise state; and generating a synthetic image based on the text prompt and the second intermediate noise state. In some aspects, the first intermediate noise state corresponds to a first diffusion time step and the second intermediate noise state corresponds to a second diffusion time step that is greater than the first diffusion time step.

One or more aspects of the method include obtaining a text prompt; generating a first intermediate noise state based on the text prompt; retrieving a second intermediate noise state based on the text prompt and the first intermediate noise state; and generating a synthetic image based on the text prompt and the second intermediate noise state.

In some examples of the method, generating the first intermediate noise state comprises obtaining an initial noise state and performing reverse diffusion to remove noise from the initial noise state. In some examples of the method, generating the synthetic image comprises performing reverse diffusion to remove noise from the second intermediate noise state.

Some examples of the method further include obtaining a plurality of text prompts. Some examples further include generating the plurality of candidate intermediate noise states based on the plurality of text prompts, respectively.

In some examples of the method, retrieving the second intermediate noise state comprises encoding the text prompt to obtain a text embedding; comparing the text embedding to a plurality of candidate text embeddings corresponding to the plurality of candidate intermediate noise states, respectively; selecting a subset of the plurality of candidate intermediate noise states based on the comparison; and comparing the first intermediate noise state to each of the subset of the plurality of candidate intermediate noise states.

In some examples of the method, retrieving the second intermediate noise state comprises encoding the text prompt to obtain a text embedding; selecting a plurality of candidate objects based on the text embedding, wherein each of the plurality of candidate objects includes a candidate noise state and a candidate text embedding that is compared to the text embedding; and responsive to determining that the first intermediate noise state and the candidate noise state of a corresponding candidate object of the plurality of candidate objects satisfies a similarity condition, selecting the candidate noise state as the second intermediate noise state. In some cases, the similarity condition relates to a similarity between the first intermediate noise state and a corresponding noise state included in a candidate object that includes the candidate noise state.

Some examples of the method further include computing a similarity score between the text embedding and each of the plurality of candidate text embeddings, respectively, wherein the text embedding is compared based on the similarity score. Some examples of the method further include identifying a plurality of candidate objects based on comparing the text embedding, wherein each of the plurality of candidate objects includes a candidate text embedding and a plurality of corresponding intermediate noise states and the subset of the plurality of candidate intermediate noise states is selected from the plurality of corresponding intermediate noise states of plurality of candidate objects.

Some examples of the method further include identifying a candidate object of the plurality of candidate objects based on comparing the first intermediate noise state to each of the subset of the plurality of candidate intermediate noise states. Some examples of the method further include identifying a diffusion time step based on the text embedding and the candidate text embedding of the candidate object. Some examples of the method further include selecting the second intermediate noise state from among the corresponding intermediate noise states of the candidate object based on the diffusion time step.

In some examples of the method, retrieving the second intermediate noise state comprises computing a distance between the first intermediate noise state and one or more of the plurality of candidate intermediate noise states, wherein the second intermediate noise state is selected based on the distance. In some examples of the method, retrieving the second intermediate noise state further comprises selecting a nearest intermediate noise state based on the distance, wherein the second intermediate noise state comprises a subsequent noise state generated from a same text prompt as the nearest intermediate noise state. In some examples of the method, retrieving the second intermediate noise state further comprises determining the subsequent noise state based on a comparison to a subsequent noise state threshold.

Figure 10:
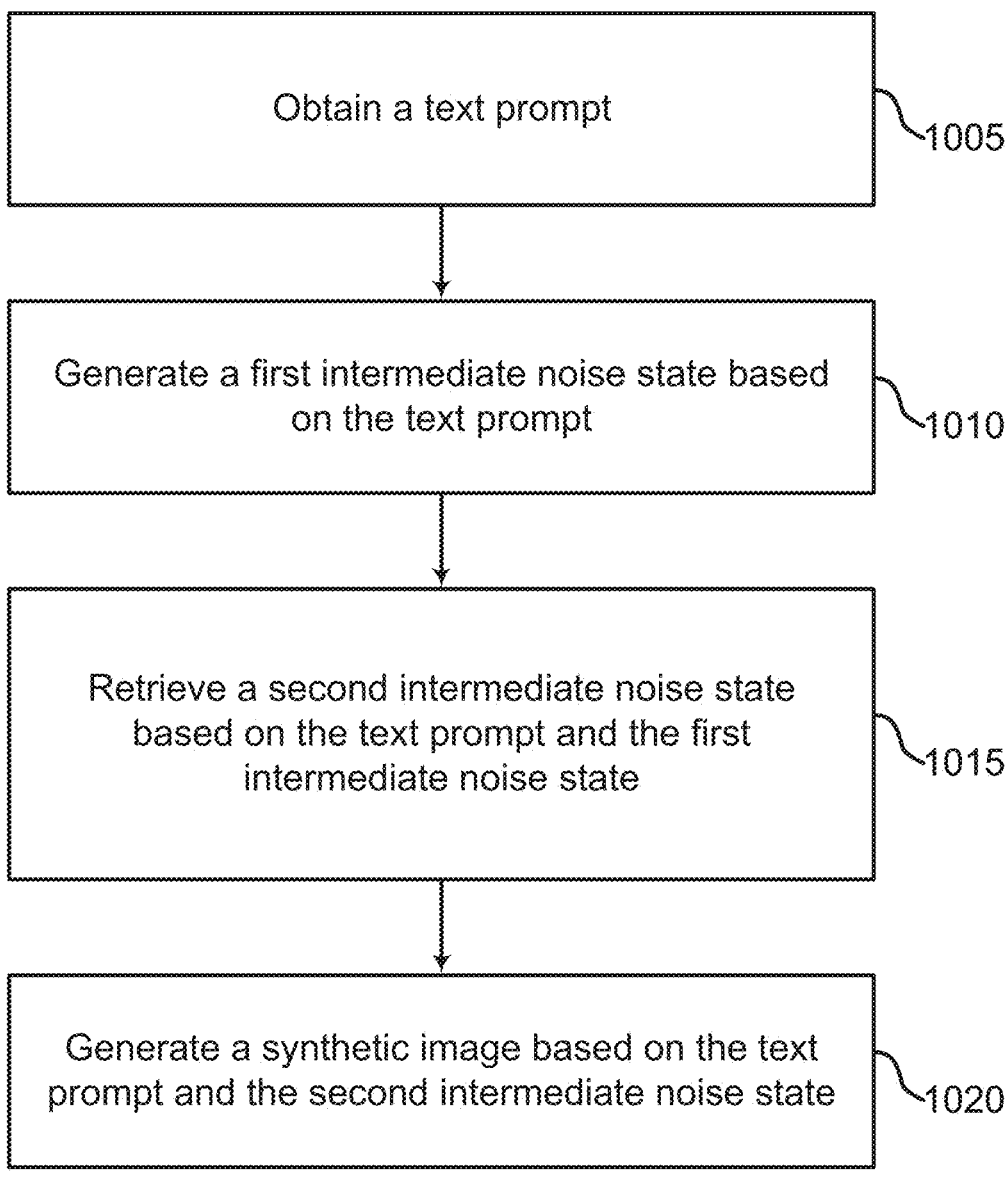
FIG. 10 shows an example of a method for generating a synthetic image according to aspects of the present disclosure.

FIG. 10 shows an example of a method 1000 for generating a synthetic image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 10, at least one aspect of the present disclosure is used in a multi-modal image generation context. For example, in some cases, a data processing apparatus (such as the data processing apparatus described with reference to FIGS. 1 and 4) uses a similarity search between an input text prompt and stored text prompts to identify a group of similar text prompts. In some cases, each of the similar text prompts is associated with a respective set of intermediate noise states (e.g., noise trajectories) that are used in an image generation process. In some cases, the data processing apparatus compares a first intermediate noise state generated based on the input text prompt to intermediate noise states associated with the group of similar text prompts to determine a second intermediate noise state. In some cases, the data processing apparatus generates a synthetic image based on the text prompt and using the second intermediate noise state.

Some aspects of the present disclosure provide a process that efficiently stores, retrieves, and leverages previous data records including a <prompt, noise, image> triplet to increase an accuracy and efficiency of text-to-image generation results. Some aspects of the present disclosure provide a training-free, retrieval-augmented text-to-image generation framework that effectively utilizes historical data triplets from user input and implements a flexible vector database for fast retrieval.

Some aspects of the present disclosure ensure that even with an increase in data triplets, a data processing system benefits from faster sampling without a significant overhead from a retrieval side. Some aspects of the present disclosure introduce a hierarchical retrieval-augmented text-to-image sampling method, where nearest prompts are first retrieved based on text embeddings, and then nearest noise trajectories are searched for among noise trajectories corresponding to the nearest prompts. Some aspects of the present disclosure resume a denoising process with an optimal neighbor and using fewer diffusion sampling steps. In some cases, compared to direct searches for nearest prompts, the hierarchical retrieval method is more robust to prompts with complex scene compositions.

Accordingly, in some cases, the data processing apparatus accelerates the image generation process by retrieving a second intermediate noise state that corresponds to a later step of an image generation process than the first intermediate noise state, allowing steps in between the steps corresponding to the first intermediate noise state and the second intermediate noise state to effectively be skipped. Furthermore, by first identifying the group of similar text prompts, and then comparing the first intermediate noise state to intermediate noise states associated with the group of similar text prompts, aspects of the present disclosure identify a second intermediate noise state that is more likely to correspond to content described by the input text prompt, and reduce a search time, than if the second intermediate noise state was to be identified based on a comparison between stored intermediate noise states alone.

At operation 1005, the system obtains a text prompt. In some cases, the operations of this step refer to, or may be performed by, a user interface as described with reference to FIGS. 4 and 7. For example, in some cases, a user (such as the user described with reference to FIG. 1) inputs the text prompt (e.g., a text string) into a user interface (such as the user interface described with reference to FIG. 4) provided on a user device (such as the user device described with reference to FIG. 1) by a data processing apparatus (such as the data processing apparatus described with reference to FIGS. 1 and 4). In some cases, the data processing apparatus stores the text prompt in a database (such as the database described with reference to FIGS. 1, 4, and 7) in an object.

At operation 1010, the system generates a first intermediate noise state based on the text prompt. In some cases, the operations of this step refer to, or may be performed by, an image generation model as described with reference to FIGS. 4 and 7.

According to some aspects, the user interface provides the text prompt to a text encoder (such as the text encoder described with reference to FIGS. 4 and 7). In some cases, the text encoder generates a text embedding (e.g., a vector or numerical representation of the text prompt) by encoding the text prompt. In some cases, the data processing apparatus stores the text embedding in the database and in the object corresponding to the text prompt.

According to some aspects, the image generation model (e.g., an image generation model $s_\theta(x_t, t, p)$) generates the first intermediate noise state using the text embedding as guidance. In some cases, the image generation model generates the first intermediate noise state using a reverse diffusion process as described with reference to FIG. 11. For example, in some cases, the image generation model generates the first intermediate noise state by obtaining an initial noise state and performing reverse diffusion to remove noise from the initial noise state. In some cases, the first intermediate noise state corresponds to a first diffusion time step (e.g., $x_{t=0.9T}$, $t \in [T, 0]$, where 0.9 T is rounded to the nearest integer).

According to some aspects, the data processing apparatus stores the first intermediate noise state in the database and in the object corresponding to the text prompt and to the text embedding. According to some aspects, the data processing apparatus stores the first intermediate noise state in a cloud (such as the cloud described with reference to FIG. 1) and adds a URL for the stored first intermediate state to the object corresponding to the text prompt and to the text embedding as metadata.

At operation 1015, the system retrieves a second intermediate noise state based on the text prompt and the first intermediate noise state. In some cases, the operations of this step refer to, or may be performed by, a query component as described with reference to FIGS. 4, 7, and 8.

According to some aspects, the query component compares the text embedding to a set of candidate text embeddings stored in the database (for example, using a cosine similarity, a distance metric, or other suitable metric for determining a similarity score between embeddings) to determine a top-k nearest subset of the set of candidate text embeddings.

According to some aspects, at least one candidate text embedding is associated with a candidate text prompt stored in the database, respectively. For example, in some cases, the candidate text embedding and the candidate text prompt are included in a candidate object stored in the database. In some cases, the text encoder generates the candidate text embedding based on the candidate text prompt.

According to some aspects, at least one candidate text embedding is associated with a set of candidate intermediate noise states stored in the database, or stored in the cloud and associated with a URL stored as metadata in the database. For example, in some cases, the set of candidate intermediate noise states, or the associated set of URLs, are included in the candidate object. According to some aspects, the image generation model generates the set of candidate intermediate noise states based on the candidate text embedding.

According to some aspects, at least one candidate text embedding is associated with a candidate image stored in the database, or stored in the cloud and associated with a URL stored as metadata in the database. For example, in some cases, the candidate image or the associated URL are included in the candidate object. According to some aspects, the image generation model generates the candidate image based on the candidate text embedding.

According to some aspects, each k candidate text embedding of the subset of candidate text embeddings is associated with a set of candidate intermediate noise states $$\{x_t^k\}_{t \in [T, 0]},$$

respectively, corresponding to $t \in [T, 0]$ steps of an image generation process (e.g., a diffusion process). According to some aspects, the query component determines a distance (e.g., an L2 distance) between the first intermediate noise state (e.g., $x_{t=0.9T}$) and a corresponding intermediate noise state generated at a corresponding diffusion step from each set of candidate intermediate noise states associated with a k candidate text embedding of the subset of candidate text embeddings $$(\text{e.g., } x_{t=0.9T}^k).$$

In some cases, the query component selects a set of candidate intermediate noise states $$x_{t=0.9T}^k$$

including a corresponding intermediate noise state that is least distant from the first intermediate noise state as an optimal set of candidate intermediate noise states $$\{\tilde{x}_t^k\}_{t\in[T,0]}.$$

In some cases, the query component determines a similarity p (e.g., a cosine similarity) between the first intermediate noise state $$(\text{e.g., } x_{t=0.9T}^k)$$

and the corresponding intermediate noise state $$(\text{e.g., } \hat{x}_{t=0.9T}^k)$$

from the optimal set of candidate intermediate noise states $$\{\hat{x}_t^k\}_{t\in[T,0]}.$$

In some cases, if the similarity p is between a first similarity threshold (e.g., 0.72) and a second similarity threshold greater than the first similarity threshold (e.g., 0.92), or equal to the second similarity threshold, the query component identifies an intermediate noise state of the optimal set of candidate intermediate noise states associated with a first resuming diffusion step (e.g., $$\hat{x}_{t=0.8T}^k,$$

with 0.8 T rounded to the nearest integer) as the second intermediate noise state. In some cases, if the similarity p is greater than the second similarity threshold, the query component identifies an intermediate noise state of the optimal set of candidate intermediate noise states associated with a second resuming diffusion step subsequent to the first resuming diffusion step (e.g., $$\hat{x}_{t=0.7T}^k,$$

with 0.7 T rounded to the nearest integer) as the second intermediate noise state.

In some cases, if the similarity p is equal to or less than the first similarity threshold, the query component identifies the first intermediate noise state as the second intermediate noise state, thereby providing a fail-safe mechanism that ensures a quality of the synthetic image when there is no appropriate candidate to expedite the image generation process.

According to some aspects, a process of identifying the second intermediate noise state is repeatable, as at least one of the first diffusion step and the subsequent diffusion step can be varied and/or retrieved multiple times. For example, in some cases, after identifying a second intermediate noise state associated with a particular diffusion time step, the data processing apparatus can use the second intermediate noise state as the first intermediate noise state and find another second intermediate noise state in the database based on the new first intermediate noise state.

At operation 1020, the system generates a synthetic image based on the text prompt and the second intermediate noise state. In some cases, the operations of this step refer to, or may be performed by, an image generation model as described with reference to FIGS. 4 and 7. For example, according to some aspects, the image generation model removes noise from the second intermediate noise state to obtain the synthetic image. In some cases, the image generation model removes noise from the second intermediate noise state based on the text embedding. According to some aspects, the image generation model removes noise from the second intermediate noise state using a number of image generation steps equal to a remaining portion of T time steps from the portion of time steps corresponding to the second intermediate noise state (e.g., in some cases, 0.8 T or 0.77)

According to some aspects, the user interface displays the synthetic image to the user. According to some aspects, the data processing apparatus stores the synthetic image in the database and in the object corresponding to the text prompt and to the text embedding. According to some aspects, the data processing apparatus stores the synthetic image in the cloud and adds a URL for the stored synthetic image to the object corresponding to the text prompt and to the text embedding as metadata.

Figure 11:
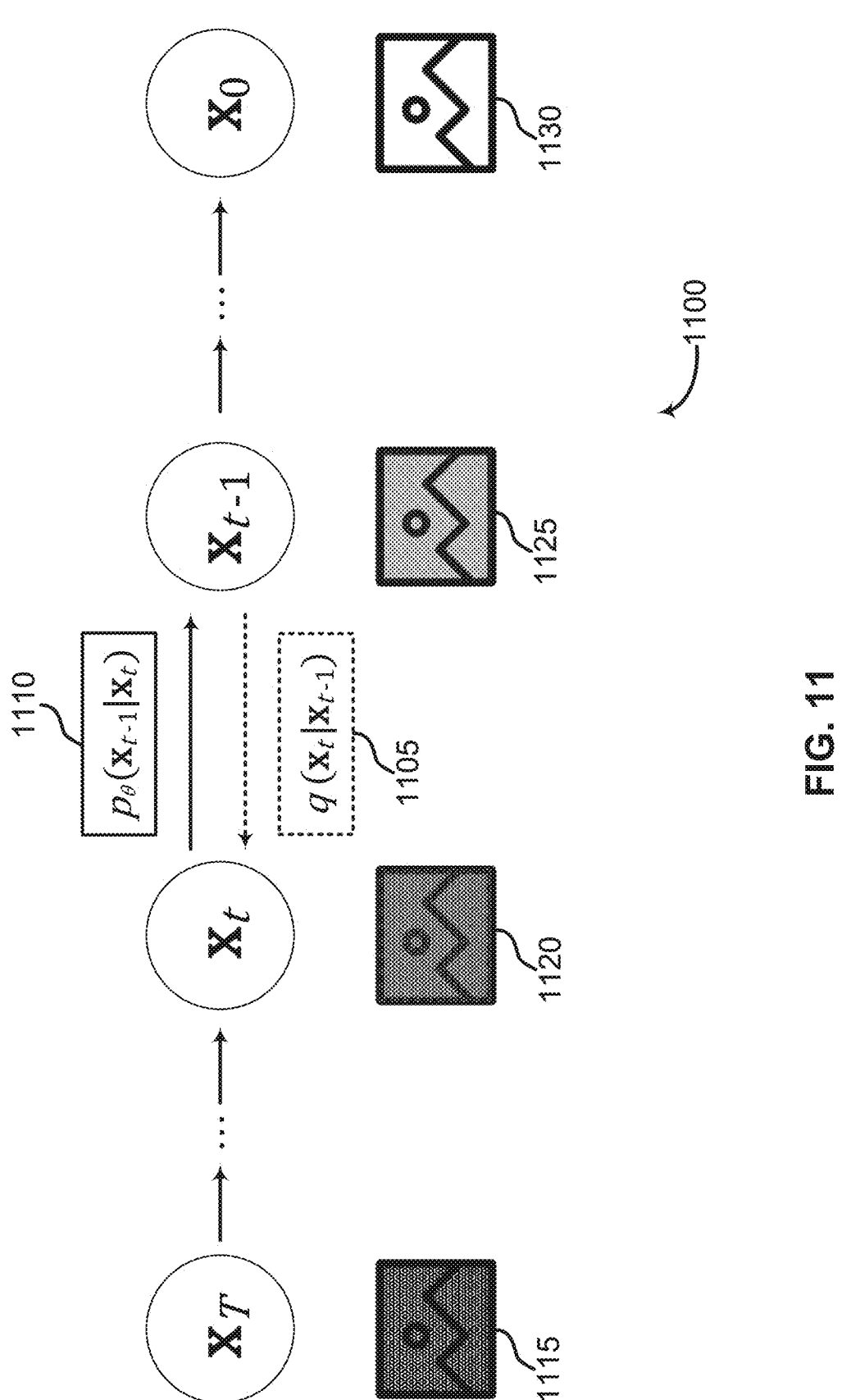
FIG. 11 shows an example of diffusion processes according to aspects of the present disclosure.

FIG. 11 shows an example 1100 of diffusion processes according to aspects of the present disclosure. The example shown includes forward diffusion process 1105 (such as the forward diffusion process described with reference to FIG. 5) and reverse diffusion process 1110 (such as the reverse diffusion process described with reference to FIG. 5). In some cases, forward diffusion process 1105 adds noise to an image or image features (e.g., original image 1130 in a pixel space or image features for original image 1130 in a latent space) to obtain a noise state 1115 (e.g., a noisy image or a noisy image features). In some cases, reverse diffusion process 1110 denoises the noise state 1115 to obtain an intermediate noise state (e.g., first intermediate noise state 1120 or second intermediate noise state 1125) and a prediction of the original image 1130.

According to some aspects, a data processing apparatus (such as the data processing apparatus described with reference to FIGS. 1 and 4) uses forward diffusion process 1105 to iteratively add Gaussian noise to an input at each diffusion step t according to a known variance schedule $0 < \beta_1 < \beta_2 < \ldots < \beta_T < 1$:

$$q(x_t \mid x_{t-1}) = \mathcal{N}(x_t; \sqrt{1-\beta_t}x_{t-1}, \beta_t I) \tag{1}$$

According to some aspects, the Gaussian noise is drawn from a Gaussian distribution with mean $\mu_t = \sqrt{1-\beta_t}x_{t-1}$ and variance. $\sigma_t^2 = \beta_t \geq 1$ by sampling $\epsilon \sim \mathcal{N}(0, I)$ and setting $x_t = \sqrt{1-\beta_t}x_{t-1} + \sqrt{\beta_t}\epsilon$. Accordingly, beginning with an initial input $x_0$, forward diffusion process 1105 produces $x_1, \ldots, x_t, \ldots x_T$, where $x_T$ is pure Gaussian noise.

In some cases, an observed variable $x_0$ (such as original image 1130) is mapped in either a pixel space or a latent space to intermediate variables $x_1, \ldots, x_T$ using a Markov chain, where the intermediate variables $x_1, \ldots, x_T$ have a same dimensionality as the observed variable $x_0$. In some cases, the Markov chain gradually adds Gaussian noise to the observed variable $x_0$ or to the intermediate variables $x_1, \ldots, x_T$, respectively, to obtain an approximate posterior $q(x_{1:T}|x_0)$.

According to some aspects, during reverse diffusion process 1110, a diffusion model (such as the image generation model described with reference to FIGS. 4-7) gradually removes noise from $x_T$ to obtain a prediction of the observed variable $x_0$ (e.g., a representation of what the diffusion model predicts the original image 1130 should be). In some cases, the prediction is influenced by a guidance prompt or a guidance vector (for example, a prompt or a prompt embedding described with reference to FIG. 7). A conditional distribution $p(x_{t-1}|x_t)$ of the observed variable $x_0$ is unknown to the diffusion model, however, as calculating the conditional distribution would require a knowledge of a distribution of all possible images. Accordingly, the diffusion model is trained to approximate (e.g., learn) a conditional probability distribution $p_\theta(x_{t-1}|x_t)$ of the conditional distribution $p(x_{t-1}|x_t)$:

$$p_\theta(x_{t-1} \mid x_t) = \mathcal{N}(x_{t-1}; \mu_\theta(x_t, t), \Sigma_\theta(x_t, t)) \qquad (2)$$

In some cases, a mean of the conditional probability distribution $p_\theta(x_{t-1}|x_t)$ is parameterized by $\mu_\theta$ and a variance of the conditional probability distribution $p_\theta(x_{t-1}|x_t)$ is parameterized by $\Sigma_\theta$. In some cases, the mean and the variance are conditioned on a noise level t (e.g., an amount of noise corresponding to a diffusion step t). According to some aspects, the diffusion model is trained to learn the mean and/or the variance.

According to some aspects, the diffusion model initiates reverse diffusion process 1110 with noisy data $x_T$ (such as noise state 1115). According to some aspects, the diffusion model iteratively denoises the noisy data $x_T$ to obtain the conditional probability distribution $p_\theta(x_{t-1}|x_t)$. For example, in some cases, at each step t−1 of reverse diffusion process 1110, the diffusion model takes $x_t$ (such as first intermediate noise state 1120) and t as input, where t represents a step in a sequence of transitions associated with different noise levels, and iteratively outputs a prediction of $x_{t-1}$ (such as second intermediate noise state 1125) until the noisy data $x_T$ is reverted to a prediction of the observed variable $x_0$ (e.g., a predicted image for original image 1130).

According to some aspects, a joint probability of a sequence of samples in the Markov chain is determined as a product of conditionals and a marginal probability:

$$x_T: p_\theta(x_{0:T}) := p(x_T)\Pi_{t=1}^{T} p_\theta(x_{t-1} \mid x_t) \qquad (3)$$

In some cases, $p(x_T) = \mathcal{N}(x_T; 0, I)$ is a pure noise distribution, as reverse diffusion process 1110 takes an outcome of forward diffusion process 1105 (e.g., a sample of pure noise $x_T$) as input, and $$\prod_{t=1}^{T} p_\theta(x_{t-1}|x_t)$$

represents a sequence of Gaussian transitions corresponding to a sequence of addition of Gaussian noise to a sample.

Search Result Retrieval

A method for data processing is described with reference to FIG. 12. One or more aspects of the method include obtaining a query comprising a text embedding and a first intermediate noise state; selecting a plurality of candidate objects based on the text embedding, wherein each of the plurality of candidate objects includes a candidate text embedding and at least one candidate intermediate noise state; selecting a candidate object from the plurality of candidate objects based on the first intermediate noise state; and providing a search result in response to the query based on the candidate object.

Some examples of the method further include obtaining a plurality of text prompts. Some examples further include encoding the plurality of text prompts to obtain a plurality of candidate text embeddings. Some examples further include generating a plurality of candidate intermediate noise states based on the plurality of candidate text embeddings, respectively, wherein the plurality of candidate objects includes the plurality of candidate text embeddings and the plurality of candidate intermediate noise states.

Some examples of the method further include generating a synthetic image based on the text embedding and the at least one candidate intermediate noise state in response to the search result, wherein the at least one candidate intermediate noise state is included in the search result.

In some aspects, the search result comprises an image generated based on the candidate text embedding. In some aspects, the search result comprises a text prompt corresponding to the candidate text embedding.

Some examples of the method include generating the text embedding based on an input text prompt. Some examples further include generating the first intermediate noise state based on the text embedding.

FIG. 12 shows an example of a method 1200 for providing a search result according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some embodiments, the process for selecting an intermediate noise state to accelerate the generation of a synthetic image may include two phases: first, a number of candidates may be selected based on similarity between text embeddings; second, a particular candidate may be selected based on similarity between the intermediate noise states. To enable this selection process, a number of candidate objects representing previously generated images may be stored in a database (e.g., as described in FIG. 9).

Each of the candidate objects may include a text prompt used to generate an image, an embedding of the text prompt, and one or more intermediate noise states. The candidate embeddings may be used to filter the candidate objects so that they relate to semantically similar images. The candidate noise states may then be compared to the intermediate noise state and a similar noise state may be selected. In some cases, the similar noise state corresponds to a more advanced diffusion timestep than the intermediate noise state in the query, so that a diffusion process can be advanced to the state of the selected noise state.

Referring to FIG. 12, at least one aspect of the present disclosure is used in a multi-modal search result retrieval context. For example, in some cases, a data processing apparatus (such as the data processing apparatus described with reference to FIGS. 1 and 4) uses a similarity search between an input text prompt and stored text prompts to identify a group of similar text prompts, where each of the group of similar text prompts is included in an object stored in a database. In some cases, each of the similar text prompts is associated with a respective set of intermediate noise states (e.g., noise trajectories) stored or linked to in the objects. In some cases, the data processing apparatus compares a first intermediate noise state to intermediate noise states associated with the group of similar text prompts to determine a similar intermediate noise state. In some cases, the data processing apparatus retrieves a search result associated with the similar intermediate noise state (e.g., an image included in or linked to in the object, or the similar intermediate noise state itself).

Accordingly, in some cases, the data processing apparatus performs a more accurate multi-modal search process than conventional searching methods by first narrowing a search field using a similarity between text prompts and then using a similarity between intermediate noise states to find a search result among the narrowed search field.

At operation 1205, the system obtains a query including a text embedding and a first intermediate noise state. In some cases, the operations of this step refer to, or may be performed by, a query component as described with reference to FIGS. 4, 7, and 8.

According to some aspects, a user (such as the user described with reference to FIG. 1) provides the query to a user interface (such as the user interface described with reference to FIG. 4) provided on a user device (such as the user device described with reference to FIG. 1) by a data processing apparatus (such as the data processing apparatus described with reference to FIGS. 1 and 4).

According to some aspects, the user provides a text prompt (e.g., a text string) to the user interface. In some cases, a text encoder (such as the text encoder described with reference to FIGS. 4 and 7) generates the text embedding based on the text prompt as described with reference to FIG. 10. According to some aspects, an image generation model (such as the image generation model described with reference to FIGS. 4-7) generates the first intermediate noise state based on the text prompt as described with reference to FIGS. 10-11. According to some aspects, the query component packages the text embedding with the first intermediate noise state to obtain the query. According to some aspects, the user provides a query parameter (e.g., what search result the data processing apparatus is intended to return using the query) to the user interface.

At operation 1210, the system selects a set of candidate objects based on the text embedding, where each of the set of candidate objects includes a candidate text embedding and at least one candidate intermediate noise state. In some cases, the operations of this step refer to, or may be performed by, a query component as described with reference to FIGS. 4, 7, and 8.

According to some aspects, the query component uses the query to search a database (such as the database described with reference to FIGS. 1, 4, and 7-8). According to some aspects, the database stores a set of objects (such as the object described with reference to FIG. 9). According to some aspects, in at least one object, a text embedding is associated with a text prompt. In some cases, the text encoder generates the text embedding stored in the object based on the text prompt stored in the object.

According to some aspects, the text embedding stored in the object is associated with a set of intermediate noise states stored in the object, or stored in the cloud and associated with a URL stored as metadata in the object. According to some aspects, the image generation model generates the set of candidate intermediate noise states associated with the object based on the text embedding stored in the object. According to some aspects, the text embedding stored in the object is associated with an image stored in the object, or stored in the cloud and associated with a URL stored as metadata in the object. According to some aspects, the image generation model generates the image associated with the object based on the text embedding stored in the object.

According to some aspects, the query component selects the set of candidate objects from among the objects stored in the database, where each candidate object respectively includes a candidate text embedding and includes or links to a set of candidate intermediate noise states $$\left\{ x_t^k \right\}_{t \in [T,0]}$$

generated based on the candidate text embedding, by identifying top-k nearest candidate text embeddings to the text embedding of the query among the text embeddings stored in the database and selecting the objects including the top-k nearest candidate text embeddings as the candidate objects.

At operation 1215, the system selects a candidate object from the set of candidate objects based on the first intermediate noise state. In some cases, the operations of this step refer to, or may be performed by, a query component as described with reference to FIGS. 4, 7, and 8.

In some cases, the first intermediate noise state corresponds to a reverse diffusion step (e.g., $x_{t=0.9T}$, where 0.9 T is rounded to a nearest integer). In some cases, the query component determines a distance (e.g., an L2 distance) between the first intermediate noise state and a corresponding intermediate noise state generated at a corresponding diffusion step from each set of candidate intermediate noise states included in the candidate objects $$\left( \text{e.g., } x_{t=0.9T}^k \right).$$

In some cases, query component 805 selects a set of candidate intermediate noise states including the least distant corresponding intermediate noise state $$\hat{x}_{t=0.9T}^k$$

as the optimal set of candidate intermediate noise states $$\left\{ \hat{x}_t^k \right\}_{t \in [T,0]}.$$

In some cases, query component selects the candidate object including the optimal set of candidate intermediate noise states as the candidate object.

At operation 1220, the system provides a search result in response to the query based on the candidate object. In some cases, the operations of this step refer to, or may be performed by, a query component as described with reference to FIGS. 4, 7, and 8.

According to some aspects, the query component returns the search result to the user, where the search result includes the candidate object or information included in the candidate object. In some cases, the query component returns the search result according to the query parameter provided by the user. For example, in some cases, the search result includes an image included in or linked to in the candidate object. In some cases, the search result includes a text prompt included in the candidate object. In some cases, the user interface displays the search result to the user.

In some cases, the search result includes an intermediate noise state included in the candidate object. In some cases, the image generation model generates a synthetic image based on the intermediate noise state included in the candidate object as described with reference to FIGS. 10-11.

Training

Figure 13:
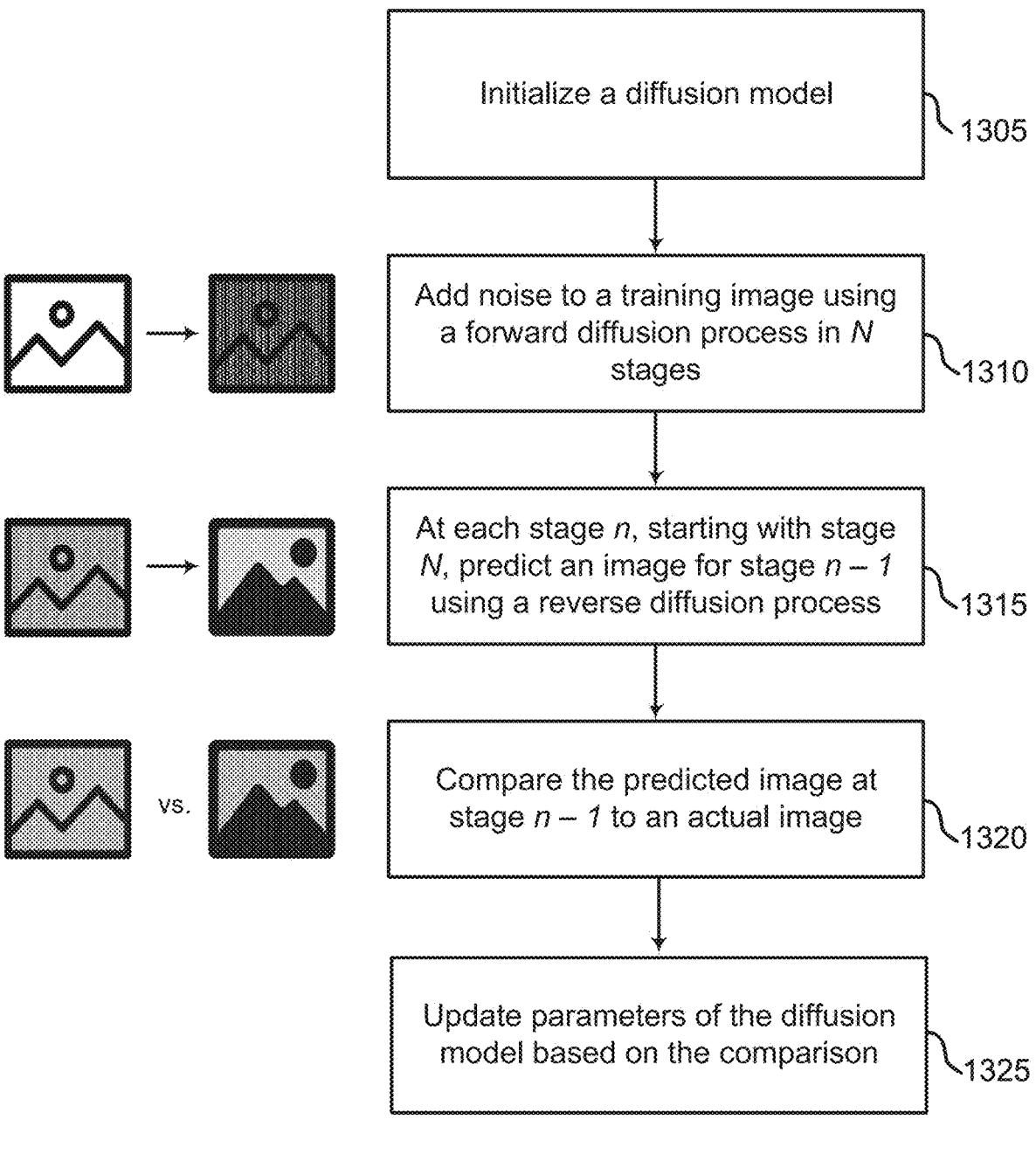
FIG. 13 shows an example of training a diffusion model according to aspects of the present disclosure.

FIG. 13 shows an example of a method 1300 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 13, according to some aspects, a training component (such as the training component described with reference to FIG. 4) trains a diffusion model (such as the image generation model described with reference to FIGS. 4-7) to generate a synthetic image.

At operation 1305, the system initializes the diffusion model. In some cases, the operations of this step refer to, or may be performed by, a training component as described with reference to FIG. 4. In some cases, the initialization includes defining the architecture of the diffusion model and establishing initial values for parameters of the diffusion model. In some cases, the training component initializes the diffusion model to implement a U-Net architecture (such as the U-Net architecture described with reference to FIG. 6). In some cases, the initialization includes defining hyperparameters of the architecture of the diffusion model, such as a number of layers, a resolution and channels of each layer block, a location of skip connections, and the like.

At operation 1310, the system adds noise to a training image using a forward diffusion process (such as the forward diffusion process described with reference to FIGS. 5 and 11) in N stages. In some cases, the operations of this step refer to, or may be performed by, a training component as described with reference to FIG. 4. In some cases, the training component retrieves the training image from a database (such as the database described with reference to FIGS. 1, 4, and 7-8).

At operation 1315, at each stage n, starting with stage N, the system predicts an image for stage n−1 using a reverse diffusion process (such as a reverse diffusion process described with reference to FIGS. 5 and 11). In some cases, the operations of this step refer to, or may be performed by, the diffusion model. In some cases, each stage n corresponds to a diffusion step t. In some cases, at each stage n, the diffusion model predicts noise that can be removed from an intermediate image to obtain a predicted image. In some cases, an original image is predicted at each stage of the training process.

In some cases, the reverse diffusion process is conditioned on a training prompt. In some cases, an encoder (such as the text encoder described with reference to FIGS. 4-5 and 7) obtains the training prompt and generates the guidance features (such as the guidance embedding described with reference to FIG. 5) in a guidance space (such as the guidance space described with reference to FIG. 5). In some cases, at each stage, the diffusion model predicts noise that can be removed from an intermediate image to obtain a predicted image that aligns with the guidance features.

At operation 1320, the system compares the predicted image at stage n−1 to an actual image, such as the image at stage or the original input image (e.g., the training image). In some cases, the operations of this step refer to, or may be performed by, a training component as described with reference to FIG. 4. In some cases, the training component computes a loss function based on the comparison.

At operation 1325, the system updates parameters of the diffusion model based on the comparison. In some cases, the operations of this step refer to, or may be performed by, a training component as described with reference to FIG. 4. In some cases, the training component updates the machine learning parameters of the diffusion model based on the loss function.

A loss function refers to a function that impacts how a machine learning model is trained in a supervised learning model. For example, during each training iteration, the output of the machine learning model is compared to the known annotation information in the training data. The loss function provides a value (the "loss") for how close the predicted annotation data is to the actual annotation data. After computing the loss, the parameters of the model are updated accordingly and a new set of predictions are made during the next iteration.

Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (e.g., a vector) and a desired output value (e.g., a single value or an output vector). In some cases, a supervised learning algorithm analyzes the training data and produces the inferred function, which can be used for mapping new examples. In some cases, the learning results in a function that correctly determines the class labels for unseen instances. For example, the learning algorithm generalizes from the training data to unseen examples. In some cases, the training component updates image generation parameters of the image generation model based on the loss.

In some cases, the training component updates parameters of the diffusion model using gradient descent. In some cases, the training component trains the diffusion model to learn time-dependent parameters of the Gaussian transitions. In some cases, the training component optimizes for a negative log likelihood.

Computing Device

Figure 14:
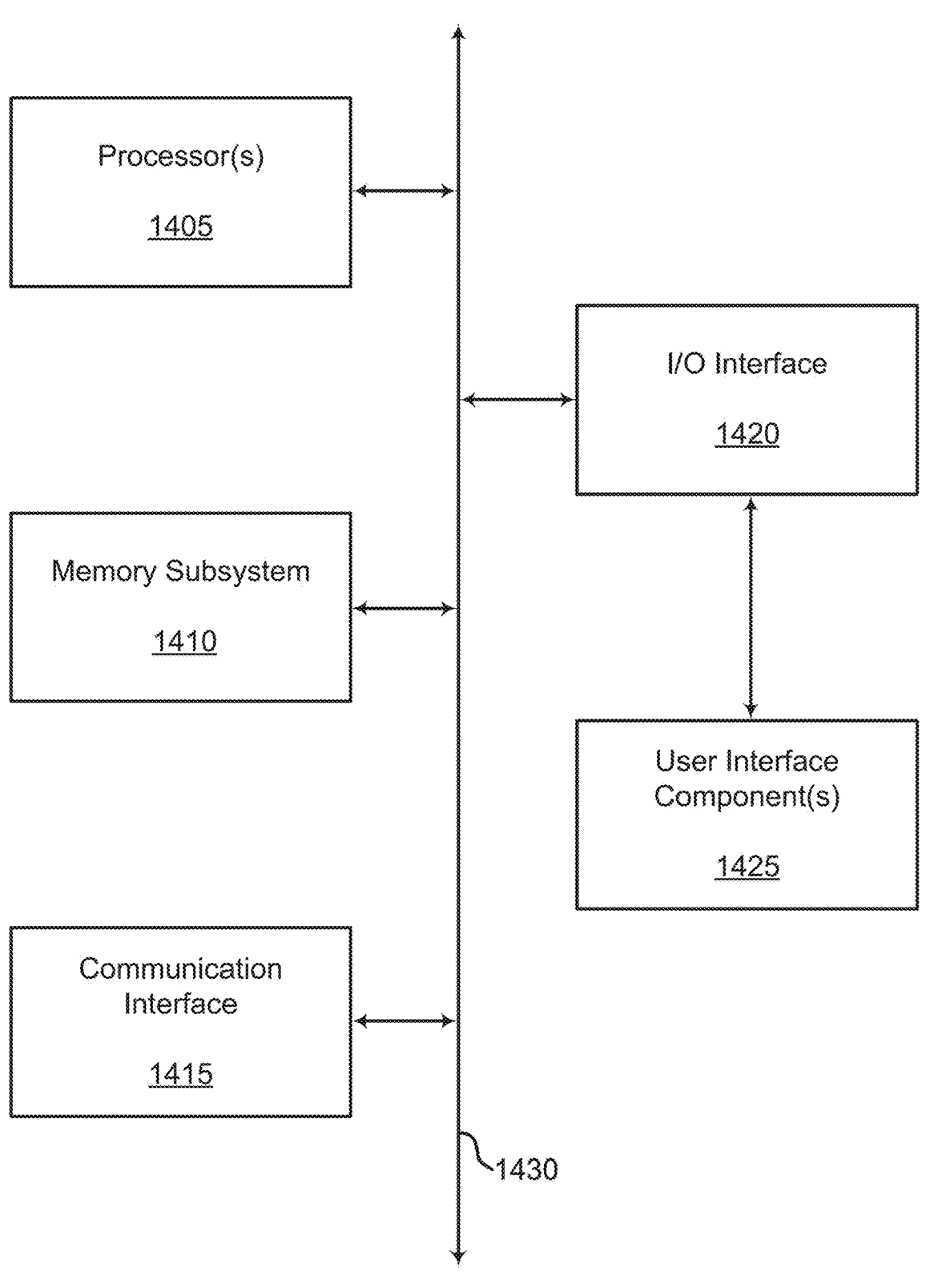
FIG. 14 shows an example of a computing device according to aspects of the present disclosure.

FIG. 14 shows an example of a computing device 1400 according to aspects of the present disclosure. According to some aspects, computing device 1400 includes processor(s) 1405, memory subsystem 1410, communication interface 1415, I/O interface 1420, user interface component(s) 1425, and channel 1430.

In some embodiments, computing device 1400 is an example of, or includes aspects of, the data processing apparatus described with reference to FIGS. 1 and 4. In some embodiments, computing device 1400 includes one or more processors 1405 that can execute instructions stored in memory subsystem 1410 to obtain a text prompt; generate, using the image generation model, a first intermediate noise state based on the text prompt; retrieve a second intermediate noise state from a database, wherein the second intermediate noise state is selected from a plurality of candidate intermediate noise states based on the text prompt and the first intermediate noise state; and generate, using the image generation model, a synthetic image based on the text prompt and the second intermediate noise state.

According to some aspects, computing device 1400 includes one or more processors 1405. Processor(s) 1405 are an example of, or includes aspects of, the processor unit as described with reference to FIG. 4. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1410 includes one or more memory devices. Memory subsystem 1410 is an example of, or includes aspects of, the memory unit as described with reference to FIG. 4. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1415 operates at a boundary between communicating entities (such as computing device 1400, one or more user devices, a cloud, and one or more databases) and channel 1430 and can record and process communications. In some cases, communication interface 1415 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some aspects, user interface component(s) 1425 enable a user to interact with computing device 1400. In some cases, user interface component(s) 1425 include an audio device, such as an external speaker system, an external display device such as a display screen, an input device (e.g., a remote-control device interfaced with a user interface directly or through the I/O controller), or a combination thereof. In some cases, user interface component(s) 1425 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for data processing, comprising:
obtaining a text prompt;
generating, using an image generation model, a first intermediate noise state based on the text prompt;
retrieving a second intermediate noise state from a database by identifying a candidate text prompt in the database based on a similarity between the text prompt and the candidate text prompt, identifying a candidate noise state based on an association in the database between the identified candidate text prompt and the candidate noise state, and identifying the candidate noise state as the second intermediate noise state based on a similarity between the first intermediate noise state and the candidate noise state; and
generating, using the image generation model, a synthetic image based on the text prompt and the second intermediate noise state.

2. The method of claim 1, wherein generating the first intermediate noise state comprises:
obtaining an initial noise state; and
performing reverse diffusion to remove noise from the initial noise state.

3. The method of claim 1, wherein generating the synthetic image comprises:
performing reverse diffusion to remove noise from the second intermediate noise state.

4. The method of claim 1, further comprising:
obtaining a plurality of text prompts; and
generating a plurality of candidate intermediate noise states based on the plurality of text prompts, respectively.

5. The method of claim 1, wherein retrieving the second intermediate noise state comprises:
encoding the text prompt to obtain a text embedding;
selecting a plurality of candidate objects based on the text embedding, wherein each of the plurality of candidate objects includes a candidate noise state and a candidate text embedding that is compared to the text embedding; and
responsive to determining that the first intermediate noise state and the candidate noise state of a corresponding candidate object of the plurality of candidate objects satisfies a similarity condition, selecting the candidate noise state as the second intermediate noise state.

6. The method of claim 5, further comprising:
computing a similarity score between the text embedding and each of the plurality of candidate text embeddings, respectively, wherein the text embedding is compared based on the similarity score.

7. The method of claim 5, wherein:
the similarity condition relates to a similarity between the first intermediate noise state and a corresponding noise state included in a candidate object that includes the candidate noise state.

8. The method of claim 1, wherein retrieving the second intermediate noise state comprises:
computing a distance between the first intermediate noise state and one or more of a plurality of candidate intermediate noise states, wherein the second intermediate noise state is selected based on the distance.

9. The method of claim 8, wherein retrieving the second intermediate noise state further comprises:
selecting a nearest intermediate noise state based on the distance, wherein the second intermediate noise state comprises a subsequent noise state generated from a same text prompt as the nearest intermediate noise state.

10. The method of claim 9, wherein retrieving the second intermediate noise state further comprises:
determining the subsequent noise state based on a comparison to a subsequent noise state threshold.

11. The method of claim 1, wherein:
the first intermediate noise state corresponds to a first diffusion time step and the second intermediate noise state corresponds to a second diffusion time step that is greater than the first diffusion time step.

12. A method for data processing, comprising:
obtaining a query comprising a
text embedding and a first intermediate noise state;
selecting a plurality of candidate objects based on the text embedding, wherein each of the plurality of candidate objects includes a candidate noise state and a candidate text embedding that is compared to the text embedding;
responsive to determining that the first intermediate noise state and the candidate noise state of a corresponding candidate object of the plurality of candidate objects satisfies a similarity condition, selecting the candidate noise state as a second intermediate noise state; and
providing a search result in response to the query based on the second intermediate noise state.

13. The method of claim 12, further comprising:
obtaining a plurality of text prompts;
encoding the plurality of text prompts to obtain a plurality of candidate text embeddings; and
generating, using an image generation model, a plurality of candidate intermediate noise states based on the plurality of candidate text embeddings, respectively, wherein the plurality of candidate objects includes the plurality of candidate text embeddings and the plurality of candidate intermediate noise states.

14. The method of claim 12, further comprising:
generating, using an image generation model, a synthetic image based on the text embedding and the candidate noise state in response to the search result, wherein the candidate noise state is included in the search result.

15. The method of claim 12, wherein:
the search result comprises an image generated based on the candidate text embedding.

16. The method of claim 12, wherein:
the search result comprises a text prompt corresponding to the candidate text embedding.

17. The method of claim 12, further comprising:
generating the text embedding based on an input text prompt; and
generating, using an image generation model, the first intermediate noise state based on the text embedding.

18. A system for data processing, comprising:
at least one memory component;
at least one processor executing instructions stored in the at least one memory component; and a query component configured to:

obtain a query comprising a text embedding and a first intermediate noise state;

select a plurality of candidate objects based on the text embedding, wherein each of the plurality of candidate objects includes a candidate noise state and a candidate text embedding that is compared to the text embedding;

responsive to determining that the first intermediate noise state and the candidate noise state of a corresponding candidate object of the plurality of candidate objects satisfies a similarity condition, select the candidate noise state as a second intermediate noise state; and provide a search result in response to the query based on the second intermediate noise state.

19. The system of claim 18, the system further comprising:

a database storing the plurality of candidate objects.

20. The system of claim 18, the system further comprising:

an image generation model comprising image generation parameters stored in the at least one memory component, wherein the image generation model is trained to generate the first intermediate noise state and to generate a synthetic image based on search result.

* * * * *